(12) United States Patent
Nagai et al.

(10) Patent No.: US 10,809,198 B2
(45) Date of Patent: Oct. 20, 2020

(54) DETECTION METHOD AND DETECTION DEVICE

(71) Applicant: KONICA MINOLTA, INC., Chiyoda-ku (JP)

(72) Inventors: Fumio Nagai, Tokyo (JP); Tetsuya Noda, Tokyo (JP); Kenichi Kubo, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 55 days.

(21) Appl. No.: 16/318,315

(22) PCT Filed: Jul. 11, 2017

(86) PCT No.: PCT/JP2017/025266
§ 371 (c)(1),
(2) Date: Jan. 17, 2019

(87) PCT Pub. No.: WO2018/016383
PCT Pub. Date: Jan. 25, 2018

(65) Prior Publication Data
US 2019/0285545 A1    Sep. 19, 2019

(30) Foreign Application Priority Data

Jul. 19, 2016  (JP) .................................. 2016-141529

(51) Int. Cl.
*G01N 21/64*    (2006.01)
*G01N 21/552*    (2014.01)
(Continued)

(52) U.S. Cl.
CPC ........... *G01N 21/648* (2013.01); *G01N 21/13* (2013.01); *G01N 21/553* (2013.01); *G01N 21/84* (2013.01);
(Continued)

(58) Field of Classification Search
CPC .... G01N 21/648; G01N 21/553; G01N 21/84; G01N 21/13; G01N 21/41; G01N 21/64; G01N 2021/8455; G01N 2021/135
See application file for complete search history.

(56) References Cited

U.S. PATENT DOCUMENTS

2005/0018194 A1\* 1/2005 Thirstrup ............. G01N 21/553
356/445
2006/0087654 A1  4/2006 Wolf et al.
(Continued)

FOREIGN PATENT DOCUMENTS

EP           3064929      9/2016
JP       2009-288103    12/2009
(Continued)

OTHER PUBLICATIONS

European Search Report dated May 23, 2019 issued in European Patent Application No. 17830902.7.

*Primary Examiner* — Sang H Nguyen
(74) *Attorney, Agent, or Firm* — Cozen O'Connor

(57) ABSTRACT

A light irradiation angle is set with respect to a first surface so as to detect only either first reflected light or second reflected light. Then, light is emitted from a light irradiation part at the set irradiation angle while a detection chip is kept in motion, either the first reflected light or the second reflected light is detected by a reflected light detection part, and positional information of the detection chip is acquired on the basis of the result of the detection of the first or second reflected light. The detection chip is moved, on the basis of the acquired positional information, to a detection position where detection of a substance to be detected is performed. While the detection chip is kept at the detection position, detection of the substance to be detected is performed through detection of sample light.

16 Claims, 10 Drawing Sheets

(51) Int. Cl.
*G01N 21/13* (2006.01)
*G01N 21/84* (2006.01)

(52) U.S. Cl.
CPC .................. *G01N 2021/135* (2013.01); *G01N 2021/8455* (2013.01)

(56) References Cited

U.S. PATENT DOCUMENTS

| | | | |
|---|---|---|---|
| 2011/0242541 A1 | 10/2011 | Hakamata | |
| 2011/0310394 A1* | 12/2011 | Li | G01N 21/553 |
| | | | 356/450 |
| 2012/0126142 A1* | 5/2012 | Matsui | G01N 21/6452 |
| | | | 250/459.1 |
| 2013/0078146 A1* | 3/2013 | Sando | G01N 21/553 |
| | | | 422/69 |
| 2013/0175457 A1* | 7/2013 | Wada | G01N 21/648 |
| | | | 250/459.1 |
| 2016/0245746 A1* | 8/2016 | Noda | G01N 21/648 |
| 2017/0153182 A1* | 6/2017 | Matsuo | G01N 21/648 |
| 2018/0313756 A1* | 11/2018 | Yamauchi | G01N 21/553 |

FOREIGN PATENT DOCUMENTS

| | | |
|---|---|---|
| WO | WO 2012/108323 | 8/2012 |
| WO | WO 2015/064704 | 5/2015 |

\* cited by examiner

DETECTION METHOD AND DETECTION DEVICE

RELATED APPLICATIONS

This is a U.S. National Phase Application under 35 USC 371 of International Application PCT/JP2017/025266 filed on Jul. 11, 2017.

This application claims the priority of Japanese application no. 2016-141529 filed Jul. 19, 2016, the entire content of which is hereby incorporated by reference.

TECHNICAL FIELD

The present invention relates to a detection method in which, after a detection chip is aligned, the presence or the amount of a detection object substance is detected using the detection chip. The present invention also relates to a detection device used for the detection method.

BACKGROUND ART

When trace substances can be quantitatively detected with high sensitivity in measurement for detection of biological substances such as protein and DNA, determination of the patient's condition and treatment can be promptly carried out. In view of this, an analysis method and an analysis apparatus for quantitatively detecting weak light generated by a very small amount detection object substance with high sensitivity are demanded. As an example of a method of detecting a detection object substance with high sensitivity, a surface plasmon resonance fluorescence analysis method (Surface Plasmon-field enhanced Fluorescence Spectroscopy (SPFS)) is known.

The SPFS uses a dielectric member including a metal film disposed on a predetermined surface. When the metal film is irradiated with excitation light through the dielectric member at an angle that causes surface plasmon resonance, localized light (enhanced electric field) can be generated on the surface of the metal film. With the localized light, a fluorescence material labelling the detection object substance captured on the metal film is excited, and therefore the presence or the amount of the detection object substance can be detected by detecting the fluorescence emitted from the fluorescence material.

In the SPFS, it is necessary to dispose a detection chip at a predetermined position with high accuracy in order to achieve detection with high sensitivity and high accuracy. While the incident angle of the excitation light with respect to the metal film is required to be adjusted with high accuracy to correctly detect the amount (density) of a detection object substance, the incident angle of the excitation light with respect to the metal film cannot be adjusted with high accuracy when the position of the detection chip is shifted. From the standpoint of usability, it is not preferable to urge the user to place the detection chip at a predetermined position with high accuracy.

A method for alignment of a detection chip in an SPFS is known (see, for example, PTL 1). In the method of alignment of a detection chip in the SPFS disclosed in PTL 1, a detection chip is moved while emitting excitation light toward a dielectric member. At this time, the reflection light of excitation light reflected by the dielectric member is detected by a light receiving sensor. Then, the location information of the detection chip is acquired based on the quantity of the light received by the light receiving sensor, and the detection chip is aligned based on the acquired location information.

CITATION LIST

Patent Literature

PTL 1
WO2015/064704

SUMMARY OF INVENTION

Technical Problem

In the method of alignment of a detection chip in the SPFS disclosed in PTL 1, however, a part of the emitted excitation light might enter the dielectric member from the incidence surface of the dielectric member, and light internally reflected in the dielectric member might reach the light receiving sensor. In addition, a shaping error of the dielectric member, an installation error of the detection chip and the like might result in a situation in which a part of the emitted excitation light is internally reflected in the dielectric member so as to reach the light receiving sensor. When not only light reflected outward by the surface of the dielectric member, but also light internally reflected in the dielectric member is detected by the light receiving sensor in the above-mentioned manner, the light might become stray light and the detection chip cannot be correctly aligned with unexpected detection results.

In view of this, an object of the present invention is to provide a detection method and a detection device in which, after alignment of a detection chip, a detection object substance is detected using the detection chip whereby it is possible to suppress reduction in accuracy of alignment of the detection chip due to light having entered the dielectric member.

Solution to Problem

To solve the above-mentioned problems, a detection method according to an embodiment of the present invention uses a detection device, the detection device including: a chip holder configured to hold a detection chip including a dielectric member having a first surface, a second surface and a third surface in which the dielectric member is transparent to light, and a detection object substance is captured on a front surface side of the second surface; a moving stage configured to move the chip holder; a light irradiation section configured to emit light toward the first surface of the dielectric member of the detection chip held by the chip holder, and to change an irradiation angle of the light emitted toward the first surface; a reflection light detection section configured to detect light that is emitted from the light irradiation section and is reflected by the dielectric member; and a sample light detection section configured to detect sample light that is generated by irradiation with light from the light irradiation section, the sample light being generated in accordance with an amount of the detection object substance captured by the detection chip, the detection method including: setting the irradiation angle of light emitted from the light irradiation section toward the first surface such that only one of first reflection light and second reflection light is detected by the reflection light detection section, the first reflection light being light from the light irradiation section that is reflected by the first surface, the second reflection light being light from the light irradiation section light that passes through the first surface and is reflected by the second surface and the third surface in this order; acquiring location information of the detection chip held by the chip holder based on a result of detection of the first reflection light or the second reflection light, the detecting being performed with the reflection light detection section by emitting light from the light irradiation section at an irradiation angle set by the setting of the light irradiation angle while moving the detection chip held by the chip holder with the moving stage such that an irradiation spot of the light emitted from the light irradiation section passes through a boundary between the first surface and another surface adjacent to the first surface; moving the detection chip with the moving stage to a detection position on a basis of location information of the detection chip that is acquired, the detection position being configured for detecting the sample light; and detecting presence or an amount of the detection object substance captured by the detection chip at the detection position by, with the detection chip located at the detection position, emitting light from the light irradiation section and by detecting sample light by the sample light detection section.

In addition, to solve the above-mentioned problems, a detection device according to an embodiment of the present invention includes: a chip holder configured to hold a detection chip including a dielectric member having a first surface, a second surface and a third surface, in which the dielectric member is transparent to light and a detection object substance is captured on a front surface side of the second surface; a moving stage configured to move the chip holder; a light irradiation section configured to emit light toward the first surface of the dielectric member of the detection chip held by the chip holder, and to change an irradiation angle of the light emitted toward the first surface; a reflection light detection section configured to detect light that is emitted from the light irradiation section and is reflected by the dielectric member; a sample light detection section configured to detect sample light that is generated by irradiation with light from the light irradiation section, the sample light being generated in accordance with an amount of the detection object substance captured by the detection chip; and a control section configured to control the moving stage, the light irradiation section, the reflection light detection section and the sample light detection section. The control section causes the light irradiation section to set a light irradiation angle such that only one of first reflection light and second reflection light is detected by the reflection light detection section, the first reflection light being light that is emitted from the light irradiation section and is reflected by the first surface, the second reflection light being light that is emitted from the light irradiation section and is reflected by the second surface and the third surface in this order after passing through the first surface; and causes the light irradiation section to emit light at an irradiation angle set by the light irradiation section while moving the detection chip held by the chip holder with the moving stage such that an irradiation spot of light emitted from the light irradiation section passes through a boundary between the first surface and another surface adjacent to the first surface so as to acquire location information of the detection chip.

Advantageous Effects of Invention

With the present invention, the detection chip can be accurately aligned even when light having entered the dielectric member is detected by the reflection light detection section, and the presence or the amount of a detection object substance can be accurately detected.

DESCRIPTION OF EMBODIMENTS

An embodiment of the present invention is elaborated below with reference to the accompanying drawings. Note that, while a detection method and a detection device for detecting a detection object substance with an SPFS are described below as an embodiment the detection method and the detection device according to the present invention, the detection method and the detection device according to the present invention are not limited to this.

Figure 1:
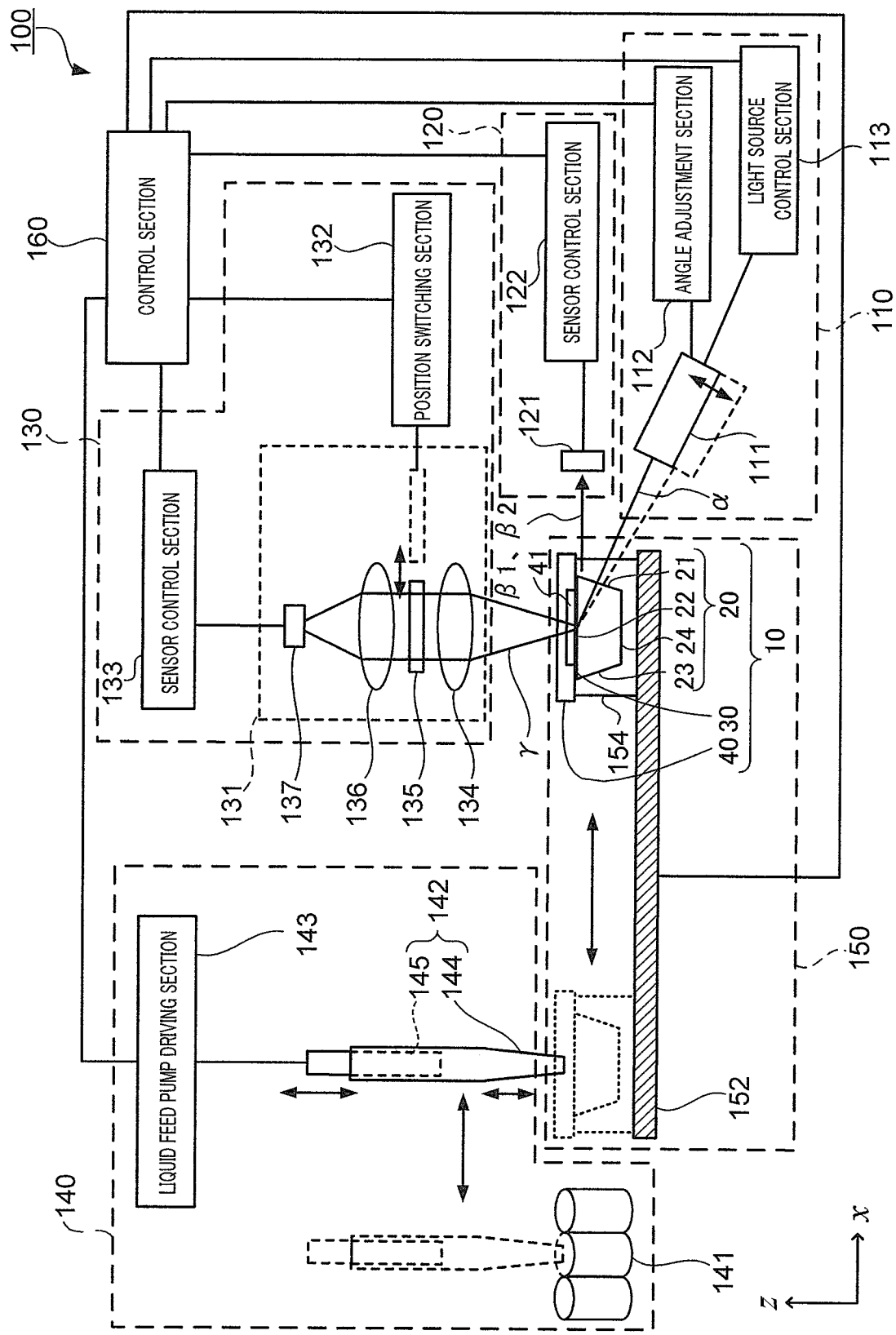
FIG. 1 schematically illustrates a configuration of a detection device according to an embodiment of the present invention.

FIG. 1 is a schematic view illustrating a configuration of detection device (surface plasmon resonance fluorescence analysis apparatus; SPFS apparatus) 100 according to an embodiment of the present invention. As illustrated in FIG. 1, detection device 100 includes excitation light emission unit 110, reflection light detection unit 120, fluorescence detection unit 130, liquid feeding unit 140, conveyance unit 150 and control section 160. Detection device 100 is used in the state where detection chip 10 is attached to chip holder 154 of conveyance unit 150. In view of this, detection chip 10 is described first, and thereafter components of detection device 100 are described.

Detection Chip

Detection chip 10 includes prism (dielectric member) 20 including incidence surface (first surface) 21, film formation surface (second surface) 22 and emission surface (third surface) 23, metal film 30 formed on film formation surface 22, and channel closure 40 disposed on film formation surface 22 or metal film 30. Normally, detection chip 10 is replaced for each analysis. Detection chip 10 is preferably a structure with each side of several millimeters to several centimeters, but may be a smaller structure or a larger structure that are not categorized as "chip."

Prism 20 is a dielectric that is transparent to excitation light α. Prism 20 includes incidence surface 21, film formation surface 22, emission surface 23 and bottom surface 24. Incidence surface 21 is a surface through which excitation light α from excitation light emission unit 110 enters prism 20. Metal film 30 is disposed on film formation surface 22. Excitation light α having entered prism 20 is reflected by the rear surface of metal film 30. To be more specific, excitation light α is internally reflected by an interface (film formation surface 22) between prism 20 and metal film 30. Emission surface 23 is a surface through which excitation light α reflected by metal film 30 is emitted out of prism 20. Bottom surface 24 is disposed opposite to film formation surface 22 and connects incidence surface 21 and emission surface 23. The shapes of incidence surface 21, film formation surface 22, emission surface 23 and bottom surface 24 are not limited. Each of incidence surface 21, film formation surface 22, emission surface 23 and bottom surface 24 may have a planer shape, a curved shape, and a combination of planer shape and a curved shape. In the present embodiment, each of incidence surface 21, film formation surface 22, emission surface 23 and bottom surface 24 has a planer shape.

The shape of prism 20 is not limited. In the present embodiment, the shape of prism 20 has a columnar shape whose bottom surface has a trapezoidal shape. In the trapezoidal shape, the surface corresponding to one bottom surface is film formation surface 22, the surface corresponding to the other bottom surface is bottom surface 24, the surface corresponding to one leg is incidence surface 21, and the surface corresponding to the other leg is emission surface 23.

Incidence surface 21 is formed such that excitation light α does not return to excitation light irradiating unit 110. When excitation light α returns to a laser diode (hereinafter also referred to as "LD") in the case where the light source of excitation light α is the LD, the excitation state of the LD is disturbed, and the wavelength and the output of excitation light α are varied. In view of this, the angle of incidence surface 21 is set within a scanning range around the ideal enhancement angle such that that excitation light α is not perpendicularly incident on incidence surface 21. The dihedral angle $\theta_a$ of film formation surface 22 and incidence surface 21, and the dihedral angle $\theta_b$ of film formation surface 22 and emission surface 23 are not limited. In the present embodiment, the dihedral angle $\theta_a$ of film formation surface 22 and incidence surface 21 is a 80-degree angle, and the dihedral angle $\theta_b$ of film formation surface 22 and emission surface 23 is a 82.5-degree angle (see FIG. 7). Here, "dihedral angle" is described. First, virtual planes perpendicular to a first plane (in the present embodiment, film formation surface 22) and a second plane (in the present embodiment, incidence surface 21 or emission surface 23) are assumed. Then, the "dihedral angle" is the smaller angle of the two angles between a first virtual intersection line, which is the intersection line of the first plane and the virtual plane, and a second virtual intersection line, which is the intersection line of the second plane and the virtual plane line.

It is to be noted that the resonance angle (and the enhanced angle in the close vicinity of the resonance angle) largely depends on the design of detection chip 10. The design factors are the refractive index of prism 20, the refractive index of metal film 30, the film thickness of metal film 30, the extinction coefficient of metal film 30, the wavelength of excitation light α, and the like. While the resonance angle and the reinforcement angle are shifted by a detection object substance fixed on metal film 30, the shift amount is smaller than several degrees.

Prism 20 has a birefringence property to a certain degree. Examples of the material of prism 20 include a resin and glass. Preferably, the material of prism 20 is a resin that has a refractive index of 1.4 to 1.6 and causes a small birefringence.

Metal film 30 is disposed on film formation surface 22 of prism 20. With this configuration, interaction (surface plasmon resonance) takes place between the photon of excitation light α incident on film formation surface 22 under a condition for total reflection and the free electron in metal film 30, and thus localized-field light can be generated on the surface of metal film 30. Note that metal film 30 needs only to be disposed in at least a part of film formation surface 22. In other words, metal film 30 may be disposed throughout the entire film formation surface 22, or in a part of film formation surface 22. In addition, in the present embodiment, film formation surface 22 has a planer shape, and accordingly the rear surface of metal film 30 has a planer shape.

The material of metal film 30 is not limited as long as a surface plasmon resonance can be caused. Examples of the material of metal film 30 include gold, silver, copper, aluminum, and their alloys. In the present embodiment, metal film 30 is a thin film formed of gold. The formation method for metal film 30 is not limited. Examples of the formation method for metal film 30 include sputtering, deposition, and plating. Preferably, the thickness of metal film 30 is, but not limited to, 30 to 70 nm.

In the present embodiment, although not illustrated, a capturing body for capturing a detection object substance is fixed (disposed) on the surface of metal film 30 that faces away from prism 20 (the front surface of metal film 30). By fixing the capturing body, the detection object substance can be selectively detected. In the present embodiment, the capturing body is uniformly fixed in a predetermined region (reaction site) on metal film 30. The type of the capturing body is not limited as long as the detection object substance can be captured. In the present embodiment, the capturing body is an antibody specific to the detection object substance or a fragment of the antibody.

Channel closure 40 is disposed on metal film 30. When metal film 30 is partly formed on film formation surface 22 of prism 20, channel closure 40 may be disposed on film formation surface 22. A channel groove is formed on the rear surface of channel closure 40. Together with metal film 30 (and prism 20), channel closure 40 forms channel 41 through which liquid flows. Examples of the liquid include sample solution including a detection object substance, labeling solution including an antibody labeled by a fluorescence material, washing solution and the like. The capturing body fixed on metal film 30 is exposed to the interior of channel 41. Both ends of channel 41 are respectively connected to an inlet and an outlet, which are formed on the top surface of channel closure 40 and are not illustrated in the drawing. When liquid is injected into channel 41, the liquid makes contact with the capturing body.

Preferably, channel closure 40 is formed of a material that is transparent to fluorescence γ emitted from metal film 30. Examples of the material of channel closure 40 include a resin. As long as the part for taking out fluorescence γ is transparent to fluorescence γ, other parts of channel closure 40 may be formed of an opaque material. Channel closure 40 is joined to metal film 30 or prism 20 by bonding with a double-sided tape, an adhesive agent and the like, laser welding, ultrasound welding, pressure bonding with a clamp member and the like, for example.

As illustrated in FIG. 1, in detection of a detection object substance, excitation light α enters prism 20 from incidence surface 21. Excitation light α having entered prism 20 hits metal film 30 at a total reflection angle (an angle at which a surface plasmon resonance is caused). By irradiating metal film 30 with excitation light α at an angle that causes a surface plasmon resonance in the above-mentioned manner, localized light (also generally called "evanescent light" or "near-field light") can be generated on metal film 30. With this localized light, the fluorescence material labelling the detection object substance placed on metal film 30 is excited, and fluorescence γ is emitted. By detecting the quantity of fluorescence γ emitted from the fluorescence material light, detection device 100 detects the presence or the amount of the detection object substance.

Detection Device

Next, the components of detection device 100 are described. As described above, detection device 100 includes excitation light emission unit 110, reflection light detection unit 120, fluorescence detection unit 130, liquid feeding unit 140, conveyance unit 150 and control section 160.

Excitation light irradiating unit 110 irradiates detection chip 10 held by chip holder 154 with excitation light α. When detecting an object substance detect, excitation light irradiating unit 110 emits, toward incidence surface 21, only P wave with respect to metal film 30 such that the incident angle to metal film 30 is an angle at which a surface plasmon resonance is caused. Here, "excitation light" is light that directly or indirectly excites the fluorescence material. For example, excitation light α is light that generates localized light that excites the fluorescence material on the surface of metal film 30 when it is emitted to metal film 30 through prism 20 at an angle that causes a surface plasmon resonance. In addition, in detection device 100 according to the present embodiment, excitation light α is used also for positioning of detection chip 10. As elaborated later, when positioning detection chip 10, excitation light emission unit 110 emits excitation light α at a predetermined irradiation angle with respect to the normal to film formation surface 22.

Excitation light irradiating unit 110 includes a configuration for emitting excitation light α toward prism 20, and a configuration for scanning the incident angle of excitation light α to the rear surface of metal film 30 (a configuration for adjusting the irradiation angle of excitation light α with respect to the normal to film formation surface 22). In the present embodiment, excitation light irradiating unit 110 includes light source unit 111, angle adjustment section 112 and light source controlling section 113.

Light source unit 111 emits collimated excitation light α having a constant wavelength and a constant quantity such that the irradiation spot on the rear surface of metal film 30 has a substantially circular shape. Light source unit 111 includes, for example, a light source of excitation light α, a beam shaping optical system, an APC section and a temperature adjustment section (which are not illustrated).

The type of the light source is not limited, and is a laser diode (LD), for example. Other examples of the light source include a light-emitting diode, a mercury lamp, and other laser light sources. In the case where the light emitted from the light source is not a beam, the light emitted from the light source is converted to a beam by a lens, a mirror, a slit and the like. In addition, in the case where the light emitted from the light source is not monochromatic light, the light emitted from the light source is converted to monochromatic light by a diffraction grid and the like. Further, in the case where the light emitted from the light source is not linear polarized light, the light emitted from the light source is converted to linear polarized light by a polarizer and the like.

The beam shaping optical system includes a collimator, a band pass filter, a linear polarization filter, a half-wave plate, a slit, a zooming unit and the like, for example. The beam shaping optical system may include one or more of the above-mentioned components. The collimator collimates excitation light α emitted from the light source. The band pass filter changes excitation light α emitted from the light source to narrowband light composed only of a central wavelength. The reason for this is that excitation light α from the light source has a slight wavelength distribution width. The linear polarization filter changes excitation light α emitted from the light source to completely linearly polarized light. The half-wave plate adjusts the polarization direction of excitation light α such that the P wave component hits on metal film 30. The slit and the zooming unit adjust the beam diameter, the outline shape and the like of excitation light α such that the shape of the irradiation spot on the rear surface of metal film 30 has a circular shape of a predetermined size.

The APC section controls the light source such that the output of the light source is maintained at a constant value. To be more specific, the APC section detects the quantity of the light diverged from excitation light α by a photodiode not illustrated and the like. Then, the APC section controls the input energy by a recurrent circuit to control the output of the light source at a constant value.

The temperature adjusting section is composed of a heater, a Peltier device, or the like, for example. The wavelength and the energy of the excitation light α from the light source can vary depending on the temperature. Therefore, the temperature of the light source is maintained at a constant value by the temperature adjusting section to control the wavelength and the energy of the excitation light α from the light source at a constant value.

In detection of a detection object substance, angle adjustment section 112 adjusts the emission angle of excitation light α incident on prism 20 with respect to metal film 30 (the interface between prism 20 and metal film 30 (film formation surface 22)), and, in acquisition of the location information of detection chip 10, angle adjustment section 112 adjusts the irradiation angle (emission angle) of excitation light α (light) with respect to the normal to film formation surface 22 prior to hitting on prism 20. The irradiation angle of excitation light α (light) can be adjusted by relatively rotating the optical axis of the excitation light α and chip holder 154.

For example, in detection of a detection object substance, angle adjustment section 112 turns light source unit 111 about the axis orthogonal to the optical axis of the excitation light α (the axis perpendicular to the plane of FIG. 1). At this time, the position of the rotation axis is set such that the position of the irradiation spot on metal film 30 is not substantially moved when the irradiation angle is scanned. By setting the position of the rotation center at a position near the intersection of the optical axes of two rays of excitation light α at both ends of the scanning range of the irradiation angle (at a position between the irradiation position on film formation surface 22 and incidence surface 21), the shift of the irradiation position can be minimized.

In the incident angle of excitation light α to metal film 30, the angle at which the maximum quantity of the plasmon scattering light is obtained is the reinforcement angle. By setting the incident angle of excitation light α with respect to metal film 30 at the reinforcement angle or an angle approximately equal to the reinforcement angle, fluorescence γ having a high intensity can be measured. While the basic incident condition of excitation light α is determined by the material and the shape of prism 20 of detection chip 10, the film thickness of metal film 30, the refractive index of the liquid in the channel and the like, the optimum incident condition slightly varies depending on the type and the amount of the fluorescence material in channel 41, shaping errors of prism 20 and the like. Therefore, it is preferable to determine the optimum enhancement angle in each measurement. In the present embodiment, the preferable irradiation angle of excitation light α to the normal of metal film 30 (straight line along the z-axis direction in FIG. 1) is approximately 70 degrees.

In addition, in acquisition of the location information of detection chip 10, angle adjustment section 112 may perform the turning about the axis same as the axis for detection of a detection object substance, or may set the position of the rotation axis such that the position of the irradiation spot on incidence surface 21 hardly varies even when the irradiation angle is scanned with respect to film formation surface 22.

Light source control section 113 controls components included in light source unit 111 to control emission of emission light (e.g. excitation light α) of light source unit 111. Light source controlling section 113 is composed of a publicly known computer, microcomputer, or the like including a computation device, a control device, a storage device, and an inputting device, for example.

Note that excitation light emission unit 110 may adjust the emission angle (irradiation angle) of excitation light α by moving an optical system in the light source. With this configuration, detection device 100 can be simplified and downsized.

Reflection light detection unit 120 detects one of first reflection light β1 and second reflection light β2 generated by irradiation of detection chip 10 with excitation light α for the purpose of positioning of detection chip 10 in an operation of detection chip 10 (e.g. injection of measurement liquid) and/or in optical measurement (such as detection of the enhancement angle, measurement of optical blank value, and detection of fluorescence γ). Preferably, reflection light detection unit 120 detects one of first reflection light β1 and second reflection light β2 for the purpose of positioning of detection chip 10 before an operation of first detection chip 10. Here, the "first reflection light β1" is light (in the present embodiment, excitation light α) that is emitted from the light source and reflected by incidence surface 21. The "second reflection light β2" is light from the light source that passes through incidence surface 21 so as to be reflected by film formation surface 22 and emission surface 23 in this order and then emitted from incidence surface 21. Note that the path of second reflection light β2 is not limited as long as the light is reflected by film formation surface 22 and emission surface 23 in this order after passing through incidence surface 21. In the present embodiment, second reflection light β2 is light that is reflected by film formation surface 22 and emission surface 23 in this order after incidence on surface 21, and is then emitted from incidence surface 21 without being reflected or passing through other surfaces.

Light receiving sensor 121 detects one of first reflection light β1 and second reflection light β2 generated by irradiation with excitation light α. The type of light receiving sensor 121 is not limited as long as one of first reflection light β1 and second reflection light β2 can be detected. For example, light receiving sensor 121 is a photodiode (PD), an area sensor or the like. Preferably, the size of the light reception surface of light receiving sensor 121 is greater than the beam diameter of excitation light α. For example, in the case where the beam diameter of excitation light α is about 1.0 mm to 1.5 mm, the length of each side of the light reception surface of light receiving sensor 121 is preferably 3 mm or greater. In the case where light receiving sensor 121 is an area sensor, a plurality of pixels are disposed in the light reception surface.

Light receiving sensor 121 is disposed at a position where one of first reflection light β1 and second reflection light β2 can be received. Preferably, light receiving sensor 121 is disposed at a position where one of first reflection light β1 and second reflection light β2 of excitation light α emitted at an angle different from the angle for detection of fluorescence γ is received. In the present embodiment, the scan range of the irradiation angle of excitation light α, with respect to the normal to film formation surface 22 (a straight line in the z-axis direction in FIG. 1), prior to hitting on prism 20 is approximately a 66 to 72-degree angle. The irradiation angle of excitation light α is set such that first reflection light β1 and second reflection light β2 from incidence surface 21 travel toward light receiving sensor 121 along the moving direction (the x-axis direction in FIG. 1) of conveyance stage (moving stage) 152. Accordingly, in this manner, light receiving sensor 121 is disposed at a position where one of first reflection light β1 and second reflection light β2 travelling in the horizontal direction reaches (see FIG. 1). In addition, a lens for condensing one of first reflection light β1 and second reflection light β2 at light receiving sensor 121 may be disposed between light receiving sensor 121 and incidence surface 21.

Sensor control section 122 controls detection of the output value of light receiving sensor 121, management of the sensitivity of light receiving sensor 121 according to the detected output value, change of the sensitivity of light receiving sensor 121 for obtaining an appropriate output value, and the like. Sensor control section 122 is composed of a publicly known computer, microcomputer, or the like including a computation device, a control device, a storage device, and an inputting device, for example.

Fluorescence detecting unit 130 detects fluorescence γ generated by irradiation of metal film 30 with excitation light α. In addition, as necessary, fluorescence detection unit 130 also detects plasmon scattering light generated by irradiation of metal film 30 with excitation light α. Fluorescence detection unit 130 includes light reception unit 131, position switching section 132 and sensor control section 133, for example.

Light receiving unit 131 is disposed in the normal direction of metal film 30 (film formation surface 22) of detection chip 10 (the z-axis direction in FIG. 1). Light reception unit 131 includes first lens 134, optical filter 135, second lens 136 and light receiving sensor 137.

First lens 134 is, for example, a condenser lens, and condenses the light emitted from metal film 30. Second lens 136 is, for example, an image forming lens, and images the light condensed by first lens 134 on the light reception surface of light receiving sensor 137. The light paths between the lenses are substantially parallel to each other. Optical filter 135 is disposed between the lenses.

Optical filter 135 removes the excitation light component (plasmon scattering light) in order to guide only the fluorescence component to light receiving sensor 137 and detect fluorescence γ with a high S/N ratio. Examples of optical filter 135 include an excitation light reflection filter, a short wavelength cut filter and a band pass filter. Optical filter 135 is, for example, a filter including a multi-layer film that reflects a predetermined light component, but may be a color glass filter that absorbs a predetermined light component.

Light receiving sensor 137 detects fluorescence γ. Light receiving sensor 137 has a high sensitivity such that weak fluorescence γ from a very small amount of detection object substance can be detected. Light receiving sensor 137 is a photomultiplier tube (PMT), an avalanche photodiode (APD), a high sensitivity photodiode (PD) or the like, for example.

Position switching section 132 switches the position of optical filter 135 between a position on the light path and a position outside the light path in light receiving unit 131. To be more specific, optical filter 135 is disposed on the light path of light reception unit 131 when light receiving sensor 137 detects fluorescence γ, and optical filter 135 is disposed at a position outside the light path of light reception unit 131 when light receiving sensor 137 detects plasmon scattering light. Position switching section 132 is composed of a rotation driving section, and a publicly known mechanism (such as a turntable and a rack-and-pinion) that laterally moves optical filter 135 by utilizing a rotational movement, for example.

Sensor control section 133 controls detection of the output value of light receiving sensor 137, management of the sensitivity of light receiving sensor 137 according to the detected output value, change of the sensitivity of light receiving sensor 137 for obtaining an appropriate output value and the like. Sensor control section 133 is composed of a publicly known computer, microcomputer, or the like including a computation device, a control device, a storage device, and an inputting device, for example.

Liquid feeding unit 140 supplies sample solution, labeling solution, washing solution and the like into channel 41 of detection chip 10 held by chip holder 154. Liquid feeding unit 140 includes chemical liquid chip 141, syringe pump 142 and liquid feed pump driving section 143.

Chemical liquid chip 141 is a vessel for housing liquid such as sample solution, labeling solution, and washing solution. Normally, as chemical liquid chip 141, a plurality of vessels corresponding to the types of the liquid are disposed, or a chip composed of a plurality of integrated vessels is disposed.

Syringe pump 142 is composed of syringe 144, and plunger 145 that can reciprocate in syringe 144. Through reciprocation of plunger 145, suction and ejection of the liquid is quantitatively performed. In the case where syringe 144 is replaceable, washing of syringe 144 is unnecessary. In view of this, preferably, syringe 144 is replaceable to prevent entry of impurities or the like. In the case where syringe 144 is not replaceable, it is possible to use syringe 144 without replacing syringe 144 by additionally providing a configuration for washing the interior of syringe 144.

Liquid feed pump driving section 143 includes a device for driving plunger 145, and a device for moving syringe pump 142. The driving device for syringe pump 142 is a device for reciprocating plunger 145, and includes a stepping motor, for example. A driving device including a stepping motor can manage the liquid feed amount of syringe pump 142 and the liquid feed speed, and is therefore preferable from the viewpoint of managing the amount of the residual liquid of detection chip 10. The device for moving syringe pump 142 freely moves syringe pump 142 in the axial direction (for example, a vertical direction) of syringe 144 and a direction (for example, a lateral direction) crossing the axial direction, for example. The moving device of syringe pump 142 is composed of a robot arm, a biaxial stage or a vertically movable turntable, for example.

Liquid feeding unit 140 sucks various kinds of liquid from chemical liquid chip 141, and supplies the liquid into channel 41 of detection chip 10. At this time, when plunger 145 is moved, the liquid reciprocates in channel 41 in measurement chip 10, and the liquid in channel 41 is agitated. In this manner, the density of the liquid can be uniformized, and reaction (for example, antigen-antibody reaction) in channel 41 can be facilitated. From the view point of performing the above-mentioned operations, it is preferable that detection chip 10 and syringe 144 be configured such that the inlet of detection chip 10 is protected with a multi-layer film and that the inlet can be tightly sealed when syringe 144 penetrates the multi-layer film.

The liquid in channel 41 is again sucked by syringe pump 142, and ejected to chemical liquid chip 141 and the like. By repeating the above-mentioned operations, reaction, washing and the like of various kinds of liquid can be performed, and a detection object substance labeled with a fluorescence material can be placed at a reaction site in channel 41.

Conveyance unit 150 conveys measurement chip 10 to a measurement position or a liquid feeding position, and fixes measurement chip 10. Here, the "measurement position" is a position where excitation light emission unit 110 irradiates detection chip 10 with excitation light α, and fluorescence detection unit 130 detects fluorescence γ generated by the irradiation. In addition, the "liquid feeding position" is a position where liquid feeding unit 140 supplies liquid into channel 41 of detection chip 10, or removes the liquid in channel 41 of detection chip 10. Conveyance unit 150 includes conveyance stage 152 and chip holder 154. Chip holder 154 is fixed to conveyance stage 152 so as to detachably hold detection chip 10. Chip holder 154 has a shape that can hold detection chip 10 and does not block the light paths of excitation light α, first reflection light β1, second reflection light β2 and fluorescence γ. For example, chip holder 154 is provided with opening through which excitation light α, first reflection light β1, second reflection light β2 and fluorescence γ pass. Conveyance stage 152 moves chip holder 154 in a specific direction (the x-axis direction in FIG. 1) and a direction opposite to the specific direction. Conveyance stage 152 is driven by a stepping motor and the like, for example.

Control section 160 controls angle adjustment section 112, light source control section 113, sensor control section 122, position switching section 132, sensor control section 133, liquid feed pump driving section 143 and conveyance stage 152. In addition, control section 160 also function as a position adjusting section which, in accordance with the detection result of reflection light detection unit 120, acquires the location information of detection chip 10 held in chip holder 154 and moves chip holder 154 by conveyance stage 152 so as to appropriately move detection chip 10 to a measurement position or a liquid feeding position. Control part 160 is composed of a publicly known computer, microcomputer, or the like including a computation device, a control device, a storage device, and an inputting device, for example.

Detection Method

Figure 2:
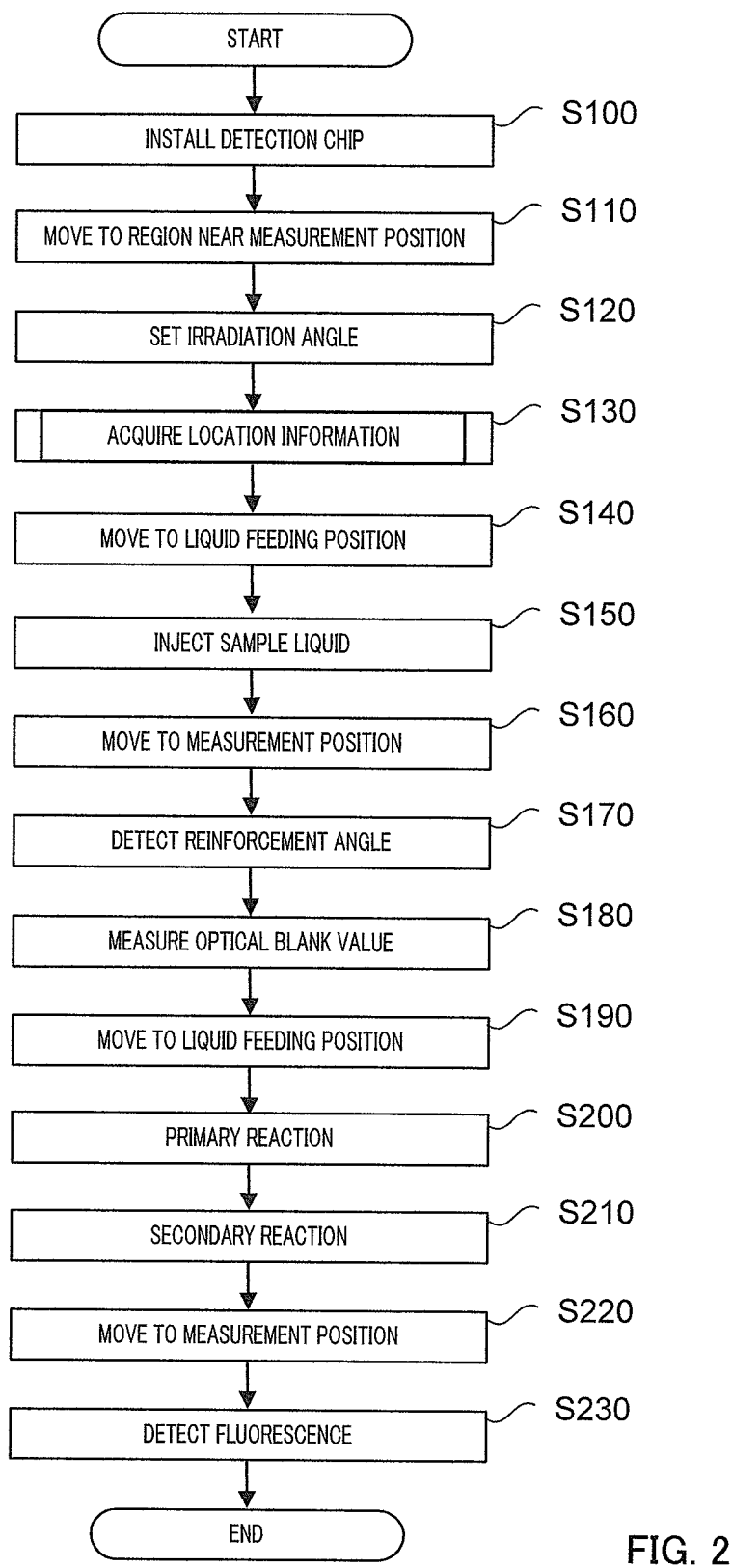
FIG. 2 is a flowchart of an operation procedure of the detection device.

Next, a detection operation of detection device 100 (the measurement method according to the embodiment of the present invention) is described. FIG. 2 is a flowchart of an exemplary operation procedure of detection device 100.

First, detection chip 10 is installed in chip holder 154 of detection device 100 (step S100).

Next, control section 160 operates conveyance stage 152 to move detection chip 10 to a position near the measurement position (step S110).

Next, control section 160 operates excitation light emission unit 110 and reflection light detection unit 120 to set the irradiation angle of light emitted from excitation light emission unit 110 (step S120). In this step, the irradiation angle of excitation light α emitted from excitation light emission unit 110 toward incidence surface 21 is set such that one of first reflection light β1, which is excitation light α reflected by incidence surface 21, and second reflection light β2, which is excitation light α transmitted through incidence surface 21 and reflected by film formation surface 22 and emission surface 23 in this order, is detected by light detection unit 120. In the step of setting the light irradiation angle, the emission angle of one of first reflection light β1 and second reflection light β2 to incidence surface 21 is determined based on the emission position of excitation light α, the irradiation angle, the angle of the surface of prism 20 through which the excitation light passes, the refractive index of prism 20, and the like. Note that while reflection light detection unit 120 needs only to detect only one of first reflection light β1 and second reflection light β2, it is preferable that reflection light detection unit 120 detect only second reflection light β2.

The initial irradiation angle of excitation light α (at the start of acquisition) is set in accordance with the shape of prism 20, for example. To be more specific, in the case where reflection light detection unit 120 detects first reflection light β1 in the step of setting the light irradiation angle, the initial irradiation angle of excitation light α is set based on the dihedral angle of film formation surface 22 and incidence surface 21. In addition, when reflection light detection unit 120 detects second reflection light β2 in the step of setting the light irradiation angle, the initial irradiation angle of excitation light α is set based on the dihedral angle of film formation surface 22 and incidence surface 21 and the dihedral angle of film formation surface 22 and emission surface 23. By setting the initial irradiation angle of excitation light α as a fixed value corresponding to the shape of prism 20 in the above-mentioned manner, the measurement time can be shortened in the case where detection object substances are detected using two types of detection chips 10 that are different in shape of prism 20 since it is not necessary to largely scan and adjust the irradiation angle of excitation light α to the initial irradiation angle such that reflection light from prism 20 hits an optimum position of reflection light detection unit 120, or it is not necessary to adjust the irradiation angle of excitation light α. In addition, since shift of the emission angle of one of first reflection light β1 and second reflection light β2 due to a shaping error of prism 20 can be corrected, the location information of detection chip 10 can be acquired with high accuracy. In view of the foregoing, it is preferable that the irradiation angle of excitation light α from excitation light emission unit 120 at the start of acquisition of the location information of detection chip 10 be set in detection device 100 in advance.

Figure 3:
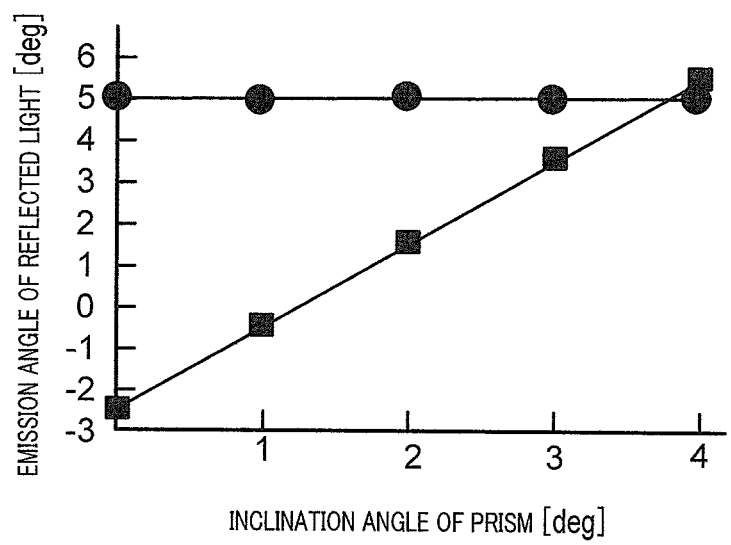
FIG. 3 is a graph illustrating a relationship between an inclination angle to a regular installation position of a prism and emission angles of a first reflection light and a second reflection light.

FIG. 3 is a graph illustrating a relationship between an inclination angle to a regular installation orientation of prism 20, and the emission angles of first reflection light β1 and second reflection light β2 from first surface 21. In FIG. 3, the abscissa indicates an inclination angle to a regular installation orientation of prism 20, and the ordinate indicates an emission angle of first reflection light β1 or second reflection light β2. Note that, in the ordinate of FIG. 3, the positive values indicate the emission angles of reflection light travelling toward the upper side (channel closure 40) with respect to a virtual plane including film formation surface 22, and the negative values indicate the emission angles of reflection light travelling toward the lower side (conveyance stage 152) with respect to the virtual plane including film formation surface 22. In FIG. 3, the black square symbols indicate results of first reflection light β1, and the black circle symbols indicate results of second reflection light β2. Note that, in the present embodiment, the dihedral angle $θ_a$ of film formation surface 22 and incidence surface 21 is a 80-degree angle, the dihedral angle $θ_b$ of film formation surface 22 and emission surface 23 is a 80-degree angle, the light irradiation angle is a 72-degree angle, and the refractive index of prism 20 is 1.527. In addition, prism 20 is tilted about a rotation axis that extends along a direction perpendicular to the paper surface of FIG. 5.

FIG. 3 shows that the emission angle of first reflection light β1 gradually increases as the inclination angle, to the regular installation orientation of detection chip 10 (prism 20), of detection chip 10 that is used in the operation increases. That is, first reflection light β1 is emitted toward channel closure 40 side when the inclination angle, to the regular installation orientation of detection chip 10 (prism 20), of detection chip 10 that is used in the operation increases. On the other hand, the emission angle of second reflection light β2 hardly changes even when the inclination angle, to the regular installation orientation of detection chip 10 (prism 20), of detection chip 10 that is used in the operation becomes large. That is, the inclination angle of second reflection light β2 hardly changes even when the inclination angle, to the regular installation orientation of detection chip 10 (prism 20), of detection chip 10 that is used in the operation is large.

In the case where the chip is tilted to the regular installation orientation of detection chip 10, the emission angle of first reflection light β1 significantly changes, whereas the emission angle of second reflection light β2 hardly changes. That is, in the present embodiment, since second reflection light β2 is received by light receiving sensor 121 to acquire the location information of detection chip 10, reflection light stably enters light receiving sensor 121 even with an installation error of detection chip 10 by the user, and thus the position can be accurately detected. In addition, incidence surface 21 that reflects excitation light α that becomes first reflection light β1 relates to the incident angle of excitation light α to metal film 30 of the case where a detection object substance is measured, and as such the degrees of freedom in design is low. This limits the range of the emission angle of first reflection light β1, and consequently first reflection light β1 hits channel closure 40 and/or returns to light source unit 111, making it difficult to cause first reflection light β1 to enter light receiving sensor 121. On the other hand, emission surface 23 does not relate to measurement of a detection object substance, and therefore the degree of freedom in design is high. Therefore, the emission angle of second reflection light β2 can be relatively freely set, and it is possible to easily cause second reflection light β2 to enter light receiving sensor 121. From the foregoing, it is preferable that detection sensor 121 detect second reflection light β2. With this configuration, detection sensor 121 can stably detect reflection light.

Next, control section 160 operates excitation light emission unit 110, reflection light detection unit 120 and conveyance stage 152 to acquire the location information of detection chip 10 (step S130). In this step, excitation light is emitted at the irradiation angle set at step S120 from excitation light emission unit 110 while moving detection chip 10 held by chip holder 154 by conveyance stage 152 such that an irradiation spot of excitation light α emitted from excitation light emission unit 110 passes through a boundary between incidence surface 21 and another surface adjacent to incidence surface 21 (in the present embodiment, the rear surface of channel closure 40), one of first reflection light β1 and second reflection light β2 is detected with reflection light detection unit 120, and the location information of detection chip 10 held by chip holder 154 is acquired based on a detection result of one of first reflection light β1 and second reflection light β2 detected by reflection light detection unit 120. In this manner, a relative positional displacement of the detected position of detection chip 10 and the measurement position or the liquid feeding position can be specified. While the surface adjacent to incidence surface 21 is the rear surface of channel closure 40 in the present embodiment, the surface adjacent to incidence surface 21 may be the bottom surface of prism 20 that is opposite to film formation surface 22.

Figure 4:
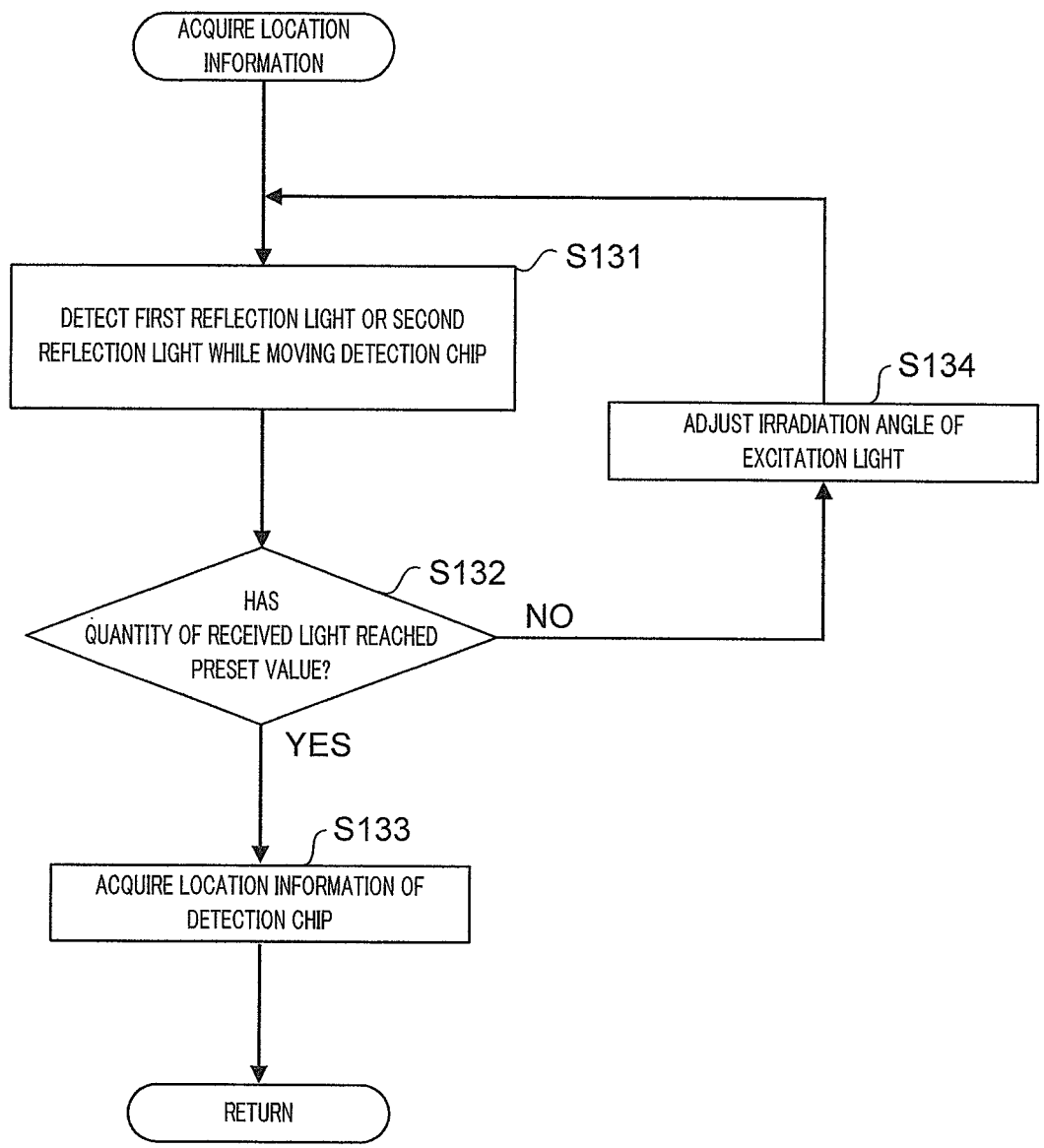
FIG. 4 is a flowchart of a step of acquiring location information of a detection chip (step S130)
Figure 5A:
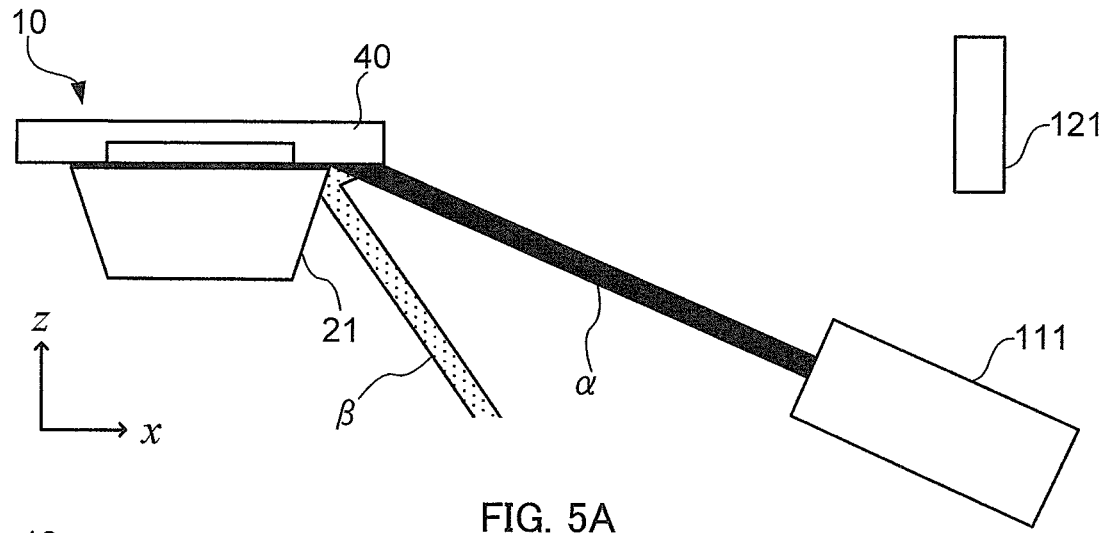
FIGS. 5A to 5C are schematic views illustrating a step of acquiring location information of a detection chip (step S130)
Figure 5B:
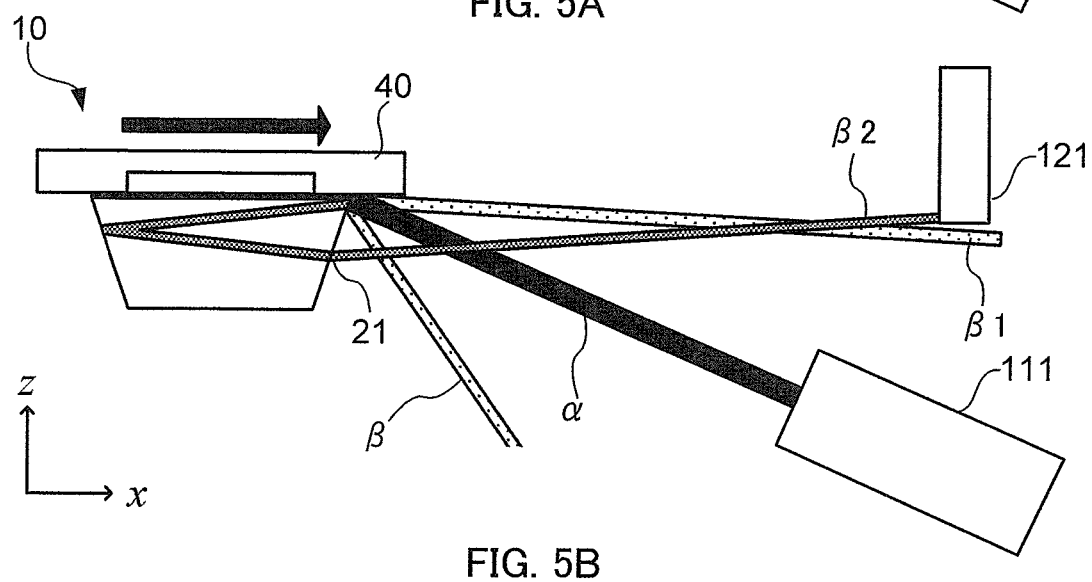
Figure 5C:
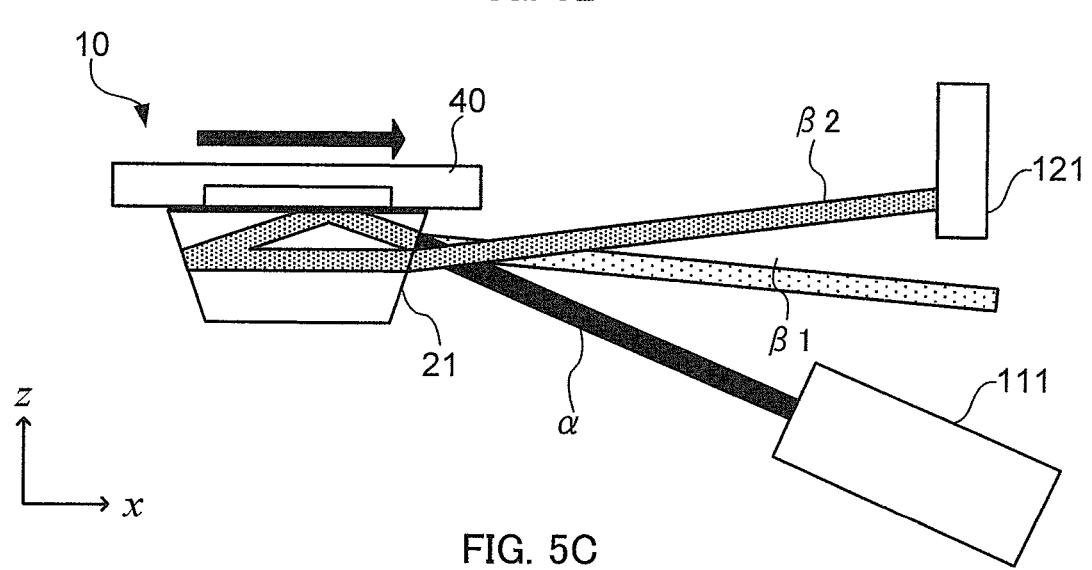
Figure 6A:
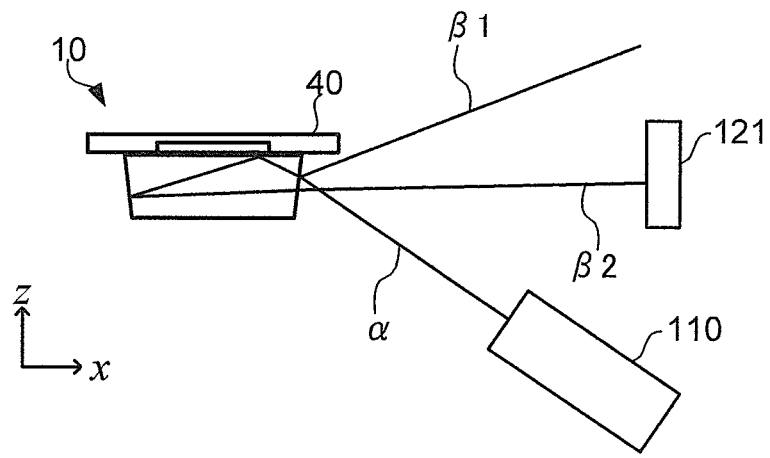
FIGS. 6A to 6C illustrate a step of adjusting an irradiation angle of emission light (step S134)
Figure 6B:
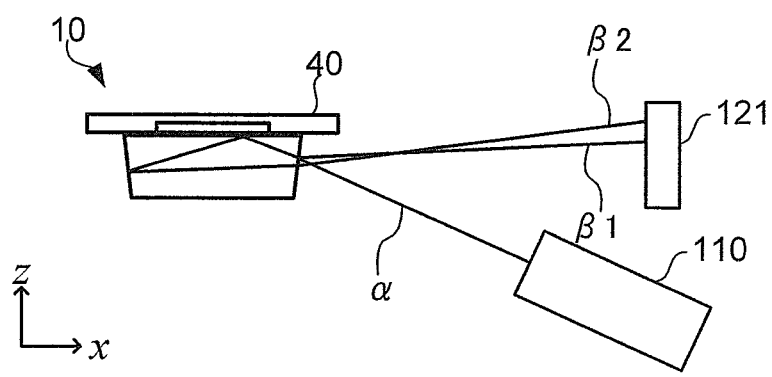
Figure 6C:
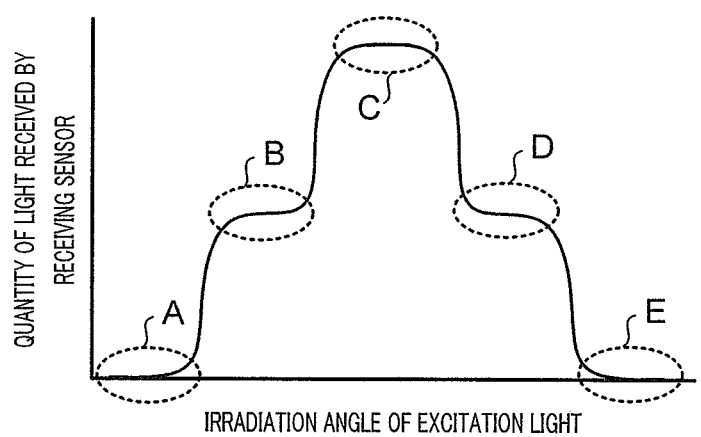
Figure 7A:
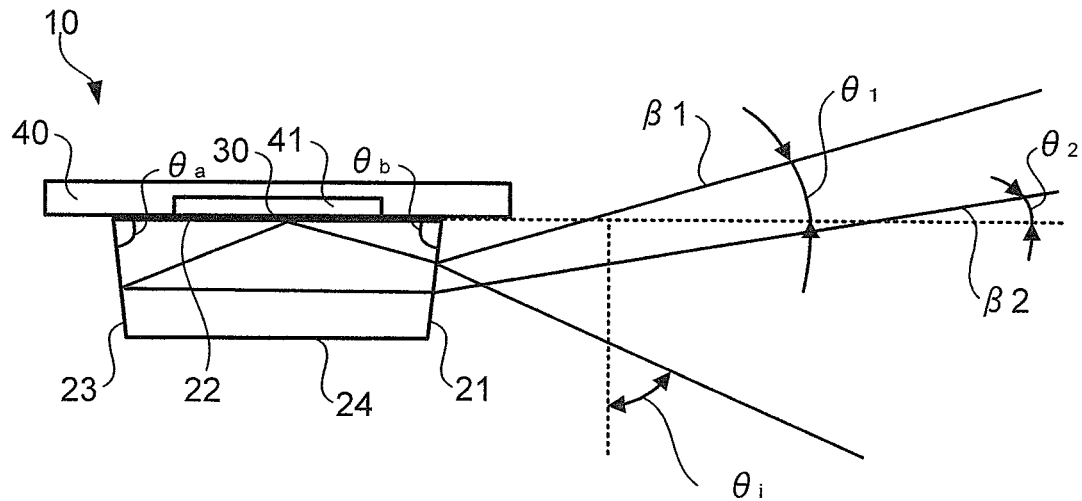
FIGS. 7A and 7B illustrate a relationship between an irradiation angle of emission light and an emission angle of reflection light.
Figure 7B:
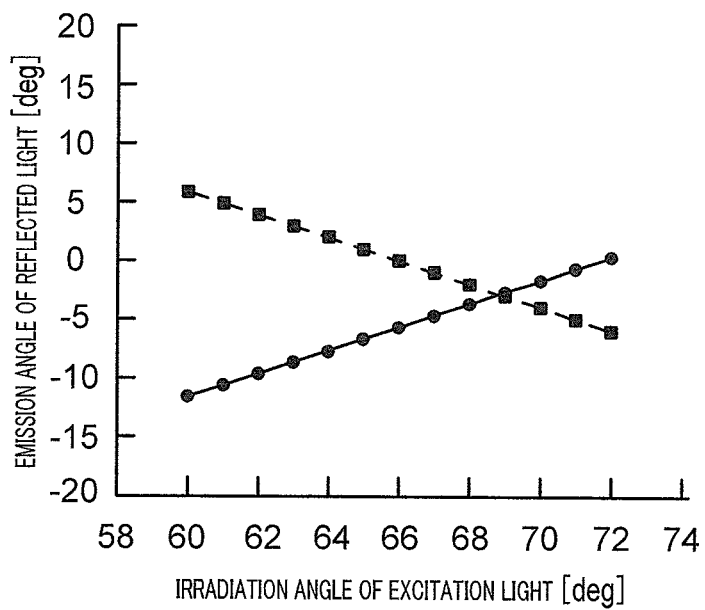
Figure 8:
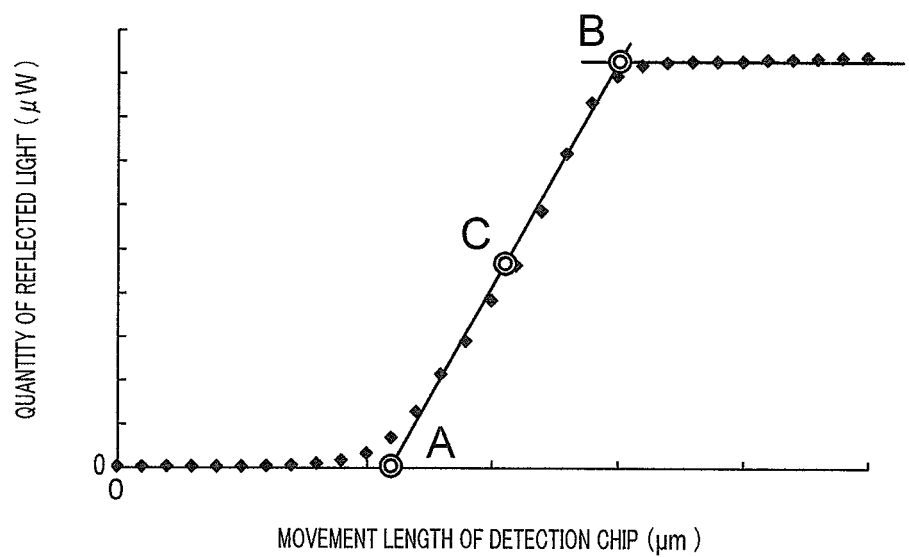
FIG. 8 is a graph showing an example of a detection result of first reflection light or second reflection light obtained with a light receiving sensor.

FIG. 4 is a flowchart of the step of acquiring the location information of detection chip 10 (step S130). FIGS. 5A to 5C are schematic views illustrating the step of acquiring the location information of detection chip 10 (step S130). FIGS. 6A to 6C illustrate the step of adjusting the irradiation angle of excitation light α (step S134). FIGS. 7A and 7B illustrate a relationship between the irradiation angle of excitation light α and the emission angle of reflection light. FIG. 8 is a graph showing an example of a detection result of first reflection light β1 or second reflection light β2 obtained with light receiving sensor 121.

As illustrated in FIG. 4, in the step of acquiring the location information of detection chip 10 (step S130), first, one of first reflection light β1 and second reflection light β2 is detected with light receiving sensor 121 while moving detection chip 10 (step S131). To be more specific, in the case where detection chip 10 is located at a position remote from light source unit 111, when light source unit 111 emits excitation light α, excitation light α is reflected by channel closure 40 toward the lower side (conveyance stage 152 side) as illustrated in FIG. 5A. Accordingly, reflection light β from detection chip 10 does not enter light receiving sensor 121 of reflection light detection unit 120. Note that, in the case where detection chip 10 is located at a position remote from light source unit 111, excitation light α does not enter detection chip 10, and neither first reflection light β1 nor second reflection light β2 is generated.

When detection chip 10 in this state is moved toward light source unit 111, the irradiation spot of excitation light α emitted from light source unit 111 reaches the boundary between prism 20 and channel closure 40 (hereinafter referred to as "edge portion"; when the joint surface of prism 20 and channel closure 40 is sufficiently thin, the edge and the boundary portion of prism surfaces 21 and 22 are not identical). In this case, as illustrated in FIG. 5B, a part of excitation light α is reflected at channel closure 40 and does not enter light receiving sensor 121. Another part of excitation light α is reflected at incidence surface 21 and becomes first reflection light β1, but does not enter light receiving sensor 121. Yet another part of excitation light α passes through incidence surface 21 so as to be reflected by film formation surface 22 and emission surface 23 in this order, and emitted from incidence surface 21 so as to enter light receiving sensor 121 as second reflection light β2. Thus, only second reflection light β2 from detection chip 10 enters light receiving sensor 121.

When detection chip 10 is further brought closer to light source unit 111, the entire irradiation spot of excitation light α emitted from light source unit 111 on incidence surface 21 reaches prism 20 incidence surface 21. Also at this time, only second reflection light β2 from detection chip 10 enters light receiving sensor 121 as illustrated in FIG. 5C. As described above, in the present embodiment, the irradiation spot is moved between incidence surface 21 and another surface adjacent to incidence surface 21 and the irradiation angle of excitation light α to incidence surface 21 is set such that one of first reflection light β1 and second reflection light β2 enters light receiving sensor 121.

Preferably, incidence surface 21 is a flat surface in the case where light receiving sensor 121 detects first reflection light β1. Preferably, incidence surface 21, film formation surface 22 and emission surface 23 are flat surfaces in the case where light receiving sensor 121 described later detects second reflection light β2. With this configuration, even when detection chip 10 is brought closer to light source unit 111 in the step of acquiring the location information of detection chip 10 (S133), the incident angle of first reflection light β1 or second reflection light β2 does not changed, and vignetting of the reflection light due to scanning of detection chip 10 in light receiving sensor 121 can be reduced, thus improving the detection accuracy of detection chip 10.

Now, the quantity of first reflection light β1 and second reflection light β2 are described. Here, it is assumed that the refractive index of prism 20 is 1.5, the reflectivity at incidence surface 21 is 4%, the reflectivity at metal film 30 is approximately 90%, and the reflectivity at emission surface 23 is 4%. In this case, when the quantity of excitation light α is defined as 100%, the quantity of first reflection light β1 is 4% of the quantity of excitation light α. In addition, when the quantity of excitation light α is defined as 100%, the quantity of second reflection light β2 is approximately 3.5% of the quantity of excitation light α. That is, when the quantity of excitation light α is defined as 100%, the quantity of first reflection light β1 incident on light receiving sensor 121 is approximately 4.0% at maximum, or the quantity of second reflection light β2 incident on light receiving sensor 121 is approximately 3.5% at maximum.

In the above-described example case, second reflection light β2 enters light receiving sensor 121 also when detection chip 10 is moved. In some situation, however, neither first reflection light β1 nor second reflection light β2 enters light receiving sensor 121 even when detection chip 10 is moved, depending on the initial irradiation angle of excitation light α, a shaping error of prism 20, an installation error of prism 20 and/or the like. In other words, in some situation the quantity of light received by light receiving sensor 121 might not be the maximum quantity. In the present invention, the irradiation angle of excitation light α is adjusted such that second reflection light β2 enters light receiving sensor 121 even when detection chip 10 is moved. To be more specific, the irradiation angle of excitation light α is adjusted based on the detection value, which is obtained at light receiving sensor 121 with fixed detection chip 10 and changes along with the change of the irradiation angle of excitation light α from excitation light emission unit 110. In the present embodiment, the irradiation angle of excitation light α prior to hitting on prism 20 with respect to the normal to film formation surface 22 is gradually largely changed. When the irradiation angle of excitation light α is significantly small, light receiving sensor 121 does not detect first reflection light β1 or second reflection light β2. Then, as the irradiation angle of excitation light α is gradually largely changed, only second reflection light β2 enters light receiving sensor 121, and subsequently, first reflection light β1 and second reflection light β2 enter light receiving sensor 121. Then, when the irradiation angle of excitation light α is further increased, second reflection light β2 travels so as not to enter light receiving sensor 121, and subsequently, also first reflection light β1 travels so as not to enter light receiving sensor 121. Whether second reflection light β2 has entered light receiving sensor 121 is determined based on whether the quantity of light received at light receiving sensor 121 (detection value) has reached a preset value. In the present embodiment, the preset value of the quantity of light received at light receiving sensor 121 is 3.5% of the quantity of excitation light α from excitation light emission unit 110 as the quantity of second reflection light β2 detected at light receiving sensor 121. When the quantity of light received at light receiving sensor 121 reaches the preset value (step S132; YES), the location information of detection chip 10 is acquired based on the quantity of received light (step S133). When the quantity of light received at light receiving sensor 121 is smaller than the preset value, the irradiation angle of excitation light α is adjusted (step S132; NO, step S134). In addition, in the case where the location information of detection chip 10 is acquired by causing first reflection light β1 to enter light receiving sensor 121, 4.0% of the quantity of excitation light α from excitation light emission unit 110 is the preset value of the quantity of received light.

In addition, in adjustment of the irradiation angle of excitation light α, the irradiation angle may be slightly changed from the initial position of the irradiation angle to a given direction. In this case, the variation of the irradiation angle may be 0.01 deg or 0.1 deg, for example. With a small variation of the irradiation angle, the position can be highly accurately detected. On the other hand, with a large variation of the irradiation angle, measurement can be quickly performed.

FIGS. 6A to 6C illustrate the step of adjusting the irradiation angle of excitation light α (step S134). FIG. 6A illustrates light paths of excitation light α in the case where the irradiation angle of excitation light α prior to hitting on prism 20 with respect to film formation surface 22 is small, FIG. 6B illustrates light paths of excitation light α in the case where the irradiation angle of excitation light α prior to hitting on prism 20 with respect to film formation surface 22 is large, and FIG. 6C is a schematic view illustrating an example of a detection result of first reflection light β1 and second reflection light β2 obtained by light receiving sensor 121.

As illustrated in FIGS. 6A to 6C, preferably, the irradiation angle of excitation light α is adjusted based on the detection value, which is obtained at light receiving sensor 121 with fixed detection chip 10 and changes along with the change of the irradiation angle of excitation light α from excitation light emission unit 110. In the present embodiment, the irradiation angle of excitation light α prior to hitting on prism 20 with respect to the normal to film formation surface 22 is gradually increased. When the irradiation angle of excitation light α is significantly small, light receiving sensor 121 does not detect first reflection light β1 or second reflection light β2 (see region A surrounded by the dotted line in FIG. 6C). As illustrated in FIG. 6A, when the irradiation angle of excitation light α is gradually increased, only second reflection light β2 enters light receiving sensor 121 (see region B surrounded by the dotted line in FIG. 6C). As illustrated in FIG. 6B, when the irradiation angle of excitation light α is further increased, first reflection light β1 and second reflection light β2 enter light receiving sensor 121 (see region C surrounded by dotted line in FIG. 6C). When the irradiation angle of excitation light α is further increased, second reflection light β2 travels so as not to enter light receiving sensor 121, and only first reflection light β1 enters light receiving sensor 121 (see region D surrounded by the dotted line in FIG. 6). When the irradiation angle of excitation light α is significantly large, light receiving sensor 121 does not detect first reflection light β1 and second reflection light β2 (see region E surrounded by the dotted line in FIG. 6). Since only one of first reflection light β1 and second reflection light β2 enters light receiving sensor 121 in the above-mentioned manner, the irradiation angle of excitation light α prior to hitting on prism 20 with respect to the normal to film formation surface 22 is limited to the predetermined range. Note that whether one of first reflection light β1 and second reflection light β2 has entered light receiving sensor 121 is determined based on whether the detection result of light receiving sensor 121 reaches a predetermined quantity of light that is received at light receiving sensor 121 when one of first reflection light β1 and second reflection light β2 enters light receiving sensor 121.

At this time, the irradiation angle of excitation light α with respect to the normal to film formation surface 22 prior to hitting on prism 20 for allowing one of first reflection light β1 and second reflection light β2 to enter light receiving sensor 121 is set as the irradiation angle of excitation light α in the positioning of detection chip 10. Note that, in the case where light receiving sensor 121 receives first reflection light β1 in order to determine the irradiation angle of excitation light α in the positioning of detection chip 10, it is preferable to set the irradiation angle of excitation light α in the positioning of detection chip 10 to the intermediate angle between the smallest irradiation angle of excitation light α for allowing only first reflection light β1 to enter light receiving sensor 121, and the largest irradiation angle of excitation light α for allowing first reflection light β1 and second reflection light β2 to enter light receiving sensor 121. In addition, in the case where second reflection light β2 is received in order to determine the irradiation angle of excitation light α in the positioning of detection chip 10, it is preferable to set the irradiation angle of excitation light α in the positioning of detection chip 10 to the intermediate angle between the smallest irradiation angle of excitation light α for allowing second reflection light β2 to enter light receiving sensor 121, and the smallest irradiation angle of excitation light α for allowing first reflection light β1 and second reflection light β2 to enter light receiving sensor 121. Note that, in the case where detection chip 10 having a shape of one type and/or a refractive index of one type is used in detection device 100, the irradiation angle of excitation light α may be a fixed value, and the step of adjusting the irradiation angle of excitation light α to an optimum position (step S134) may be omitted.

In addition, it is preferable to set the irradiation angle of excitation light α such that the smaller angle between first reflection light β1 and second reflection light β2 is a predetermined angle. With the above-mentioned setting of the irradiation angle of excitation light α, when one of first reflection light β1 and second reflection light β2 enters light receiving sensor 121, generation of stray light due to the other reflection light is suppressed.

Now, the relationship between the irradiation angle of excitation light α and the emission angles of first reflection light β1 and second reflection light β2 is described. FIGS. 7A and 7B illustrate a relationship between the irradiation angle of excitation light α and the emission angles of first reflection light β1 and second reflection light β2. FIG. 7A illustrates the irradiation angle of excitation light α and the emission angles of first reflection light β1 and second reflection light β2, and FIG. 7B is a graph illustrating a relationship between the irradiation angle of excitation light α and the emission angles of first reflection light β1 and second reflection light β2. In FIG. 7B, the abscissa indicates the irradiation angle of excitation light α. In addition, the ordinate indicates the emission angle of first reflection light β1 or second reflection light β2. Note that, in the ordinate of FIG. 7B, the positive values indicate the emission angle of reflection light travelling toward the upper side (channel closure 40) with respect to a virtual plane including film formation surface 22, and the negative values indicate the emission angle of reflection light travelling toward the lower side (conveyance stage 152) with respect to the virtual plane including film formation surface 22. In FIG. 7B, black square symbols indicate results of first reflection light β1, and black circle symbols indicate results of second reflection light β2. Note that, in the present embodiment, the dihedral angle $\theta_a$ of film formation surface 22 and incidence surface 21 is a 78-degree angle, the dihedral angle $\theta_b$ of film formation surface 22 and emission surface 23 is a 84-degree angle, and the refractive index of prism 20 is 1.527.

As illustrated in FIG. 7A, irradiation angle $\theta_i$ of excitation light α is an angle to the normal to film formation surface 22. In addition, emission angle $\theta_1$ of first reflection light β1 is an angle to a virtual plane including film formation surface 22, and emission angle $\theta_2$ of second reflection light β2 is an angle to a virtual plane including film formation surface 22. As illustrated in FIG. 7B, the emission angle of first reflection light β1 decreases as the irradiation angle of excitation light α increases. In addition, the emission angle of second reflection light β2 increases as the irradiation angle of excitation light α increases. In addition, since the smaller angle between first reflection light β1 and second reflection light β2 is preferably greater than a 4-degree angle, it is preferable that the irradiation angle of excitation light α prior to hitting on prism 20 with respect to the normal to film formation surface 22 be greater than a 70.8-degree angle and smaller than a 66.8-degree angle.

To be more specific, the light irradiation angle with respect to the normal to film formation surface 22 prior to hitting on prism 20 is adjusted such that in a plane including the light reception surface of light receiving sensor 121, the distance between first reflection light β1 and second reflection light β2 is greater than the length of the light reception surface in a range of a straight line connecting two points passing through the optical axes of first reflection light β1 and second reflection light β2. With this configuration, only one of first reflection light β1 and second reflection light β2 reaches the light reception surface of light receiving sensor 121, and the quantity of received light can be stably measured.

Further, it is preferable to adjust the irradiation angle of excitation light α such that the following expression (1) or expression (2) is satisfied.

$$\sin(\theta_a - \theta_i - 2°) > n_1 \cos \theta_b \quad (1)$$

$$n_1 \cos \theta_b > \sin(\theta_a - \theta_i + 2°) \quad (2)$$

In expression (1) and expression (2), $\theta_i$ is the irradiation angle, to the normal to the second surface, of light emitted from the light irradiation section prior to hitting on the dielectric member, $\theta_a$ is a dihedral angle between the second surface and the first surface, $\theta_b$ is a dihedral angle between the second surface and the third surface, and $n_1$ is a refractive index of the dielectric member.

When the irradiation angle of excitation light α is adjusted so as to satisfy expression (1) or expression (2), first reflection light β1 and second reflection light β2 are emitted from incidence surface 21 at an angle greater than a 2-degree with respect to a virtual plane including film formation surface 22. Thus, the distance between first reflection light β1 and second reflection light β2 increases as the distance from incidence surface 21 increases, and only first reflection light β1 or second reflection light β2 can be readily detected at light receiving sensor 121.

For example, in the case where the location information of detection chip 10 is acquired by allowing only second reflection light β2 to enter light receiving sensor 121, an emission angle for allowing only second reflection light β2 to enter light receiving sensor 121 is set, and the emission angle is set to a value of the emission angle thus obtained, and again, second reflection light β2 is detected by light receiving sensor 121 while moving detection chip 10 (step S131). When the quantity of light received at light receiving sensor 121 reaches the preset value (step S132; YES), the location information of detection chip 10 is acquired (step S133). The location information of detection chip 10 may be acquired by allowing only first reflection light β1 to enter light receiving sensor 121. In this case, the emission angle of excitation light α is adjusted such that only first reflection light β1 enters light receiving sensor 121.

FIG. 8 is a graph showing an example of a detection result of first reflection light β1 or second reflection light β2 obtained with light receiving sensor 121. In this example, as in step S131, the quantity of first reflection light β1 or second reflection light β2 is measured by light receiving sensor 121 while moving detection chip 10 by conveyance stage 152 in one direction (x-axis direction). FIG. 8 also illustrates three approximation lines.

As illustrated in FIG. 8, at an initial phase, no reflection light (first reflection light β1 or second reflection light β2) is measured by light receiving sensor 121 even when detection chip 10 is moved in the X-axis direction. The reason for this is that excitation light α is reflected by channel closure 40 so as to travel toward the lower side (conveyance stage 152 side) without entering light receiving sensor 121 (see FIG. 5A). When the movement of detection chip 10 is continued, the quantity of one of first reflection light β1 and second reflection light β2 entering light receiving sensor 121 gradually increases. The reason for this is that a part of excitation light α is reflected by incidence surface 21 and enters light receiving sensor 121 as first reflection light β1, or that a part of excitation light α hits incidence surface 21 so as to be reflected by film formation surface 22 and emission surface 23 in this order and emitted from incidence surface 21 and enters light receiving sensor 121 as second reflection light β2 (see FIG. 5B). When the movement of detection chip 10 is further continued, the quantity of one of first reflection light β1 and second reflection light β2 entering light receiving sensor 121 becomes constant. The reason for this is that the entirety of one of first reflection light β1 and second reflection light β2 enters light receiving sensor 121 (see FIG. 5C).

In FIG. 8, each of the horizontal part of the first half, the inclined part, and the horizontal part of the latter half is approximated by a linear line. In the graph, point A is the intersection of the approximation straight line of the horizontal part in the first half and the approximation straight line of the inclined part. Point B is the intersection of the approximation straight line of the inclined part and the approximation straight line of the horizontal part in the latter half. Point C is the middle point between point A and point B. Point A corresponds to a minimum value of the quantity of reflection light β. Point B corresponds to a maximum value of the quantity of reflection light β. Point C corresponds to an intermediate value of the quantity of reflection light β.

In the graph of FIG. 8, the position of detection chip 10 can be specified with use of points A to C. Point A and point B indicate points where an end of the irradiation spot of excitation light α reaches the edge. Accordingly, the position of the edge can be specified by considering the irradiation spot diameter of excitation light α, and as a result, the position of detection chip 10 can be specified. On the other hand, point C indicates a point where the center of the irradiation spot of excitation light α reaches the edge. When point C is used, the position of the edge can be specified without considering the irradiation spot diameter of excitation light α, and as a result, the position of detection chip 10 can be specified. Accordingly, from the viewpoint of suppressing the influence of the irradiation spot diameter of excitation light α, it is preferable to use the intermediate value of the amount of first reflection light β1 or second reflection light β2 of excitation light α to specify the position of detection chip 10. Alternatively, the position of detection chip 10 may be specified at any positions between point A and point B without using the points A to C.

In this manner, the position of detection chip 10 can be specified by irradiating detection chip 10 with excitation light α and by detecting only one of first reflection light β1 and second reflection light β2 of excitation light α.

Next, control section 160 operates conveyance stage 152 on the basis of the location information of detection chip 10 acquired at step S130 to move detection chip 10 to the liquid feeding position (step S140).

Next, control section 160 operates liquid feeding unit 140 to wash the interior of channel 41 with washing solution (step S150). It is to be noted that when moisturizing agent is present in channel 41 of detection chip 10, the interior of channel 41 is washed prior to the introduction of the sample solution to remove the moisturizing agent so that the capturing body can appropriately capture the detection object substance.

Next, control section 160 moves chip holder 154 by using conveyance stage 152 on the basis of the location information of detection chip 10 acquired at step S130 so as to move detection chip 10 to an appropriate measurement position (step S160). At this time, detection chip 10 is moved based on the acquired location information, and therefore detection chip 10 can be moved to the detection position with high accuracy.

Next, control section 160 operates excitation light irradiation unit 110 and fluorescence detection unit 130 to irradiate detection chip 10 disposed at an appropriate measurement position with excitation light α, and detects plasmon scattering light whose wavelength is identical to excitation light α, thereby detecting the reinforcement angle (step S170). To be more specific, control section 160 operates excitation light irradiation unit 110 to scan the incident angle of excitation light α to metal film 30, while operating fluorescence detection unit 130 to detect plasmon scattering light. At this time, control section 160 operates position switching section 132 to dispose optical filter 135 at a position outside the light path of light receiving unit 131. Then, control section 160 determines the incident angle of excitation light α at which the quantity of the plasmon scattering light is maximized as the reinforcement angle. Note that, preferably, the enhancement angle is different from the irradiation angle of excitation light α acquired in the step of acquiring the location information of detection chip 10 (step S130). If the enhancement angle is equal to the irradiation angle of excitation light α acquired in the step of acquiring the location information of detection chip 10 (step S130), first reflection light β1 or second reflection light β2 reflected by detection chip 10 can be reflected by the light reception surface of light receiving sensor 121, and the reflection light can travel toward fluorescence detection unit 130 side, thus generating stray light that degrades the measurement accuracy. If the step of injecting sample liquid (step S150) is performed prior to the step of acquiring the location information (step S130), plasmon due to excitation light α can be generated in a region around metal film 30 in acquisition of the location information of detection chip 10, and the quantity of the reflected excitation light α at film formation surface 22 and the quantity of light detected by detection sensor 121 can be changed, and consequently, the position of detection chip 10 might not be correctly detected.

Next, control section 160 operates excitation light irradiation unit 110 and fluorescence detection unit 130 to irradiate detection chip 10 disposed at an appropriate measurement position with excitation light α, and records an output value (optical blank value) of light receiving sensor 137 (step S180). At this time, control section 160 operates angle adjustment section 112 to set the incident angle of excitation light α, with respect to metal film 30, to the enhanced angle. In addition, control section 160 controls position switching section 132 to dispose optical filter 135 at a position on the light path of light receiving unit 131.

Next, control section 160 operates conveyance stage 152 on the basis of the location information of detection chip 10 acquired at step S130 to move detection chip 10 to the liquid feeding position (step S190).

Next, control section 160 operates liquid feeding unit 140 to inject the sample solution in chemical liquid chip 141 into channel 41 of detection chip 10 (step S200). In channel 41, a detection object substance is captured on metal film 30 by an antigen-antibody reaction (primary reaction). Thereafter, the sample solution in channel 41 is removed, and the interior of the channel is washed with the washing solution.

Next, after the washing, control section 160 operates liquid feeding unit 140 to introduce liquid (labeling solution) including a secondary antibody labeled by a fluorescence material into channel 41 of detection chip 10 (step S210). In channel 41, through an antigen-antibody reaction (secondary reaction), a detection object substance that is captured on metal film 30 is labeled by the fluorescence material. Thereafter, the labeling solution in channel 41 is removed, and the interior of the channel is washed with the washing solution.

Next, on the basis of the location information of detection chip 10 acquired at step S130, control section 160 moves detection chip 10 by conveyance stage 152 to a detection position at which to detect the detection object substance (step S220). At this time, since detection chip 10 is moved based on the acquired location information, detection chip 10 can be moved to the detection position with high accuracy.

Next, control section 160 operates excitation light irradiation unit 110 and fluorescence detection unit 130 to irradiate detection chip 10 disposed at the appropriate measurement position with excitation light α, and detects fluorescence γ emitted from the fluorescence material for labelling the detection object substance captured by the capturing body (step S230). At this time, control section 160 operates angle adjustment section 112 to set the emission angle of excitation light α to the enhanced angle. In addition, preferably, excitation light emission unit 110 emits excitation light α at an angle different from the irradiation angle of excitation light α acquired in the step of acquiring the location information of detection chip 10 (S130). Control section 160 subtracts the optical blank value from the detection value to calculate the intensity of the fluorescence correlating with the amount of the detection object substance. The intensity of the detected fluorescence is converted to the amount, the concentration, and the like of the detection object substance as necessary.

Through the above-mentioned procedure, the presence or the amount of the detection object substance in the sample solution can be detected.

Note that, in the case where the irradiation angle of excitation light α for detecting the detection object substance is set in advance, the detection of the enhancement angle (step S170) may be omitted. While, in the above description, the step of labelling the detection object substance with a fluorescence material (the secondary reaction, step S210) is performed (two step method) after the step of causing a reaction between the detection object substance and the capturing body (the primary reaction, step S200), the timing when the detection object substance is labeled with the fluorescence material is not limited. For example, the labeling solution may be added to the sample solution to preliminarily label the detection object substance with the fluorescence material before the sample solution is introduced into the channel of detection chip 10. In addition, the sample solution and the labeling solution may be simultaneously injected into the channel of detection chip 10. In the former case, by injecting the sample solution into the channel of detection chip 10, the detection object substance labeled with the fluorescence material is captured by the capturing body. In the latter case, the detection object substance is labeled with the fluorescence material while the detection object substance is captured by the capturing body. In either case, by introducing the sample solution into the channel of detection chip 10, both the primary reaction and the secondary reaction can be completed (one step method). In the case where the one step method is employed as described above, the step of setting the irradiation angle of excitation light α (step S120) and the step of acquiring the location information of detection chip 10 (step S130) are performed before the detection of the enhancement angle (step S170) is performed prior to the antigen-antibody reaction.

Figure 9A:
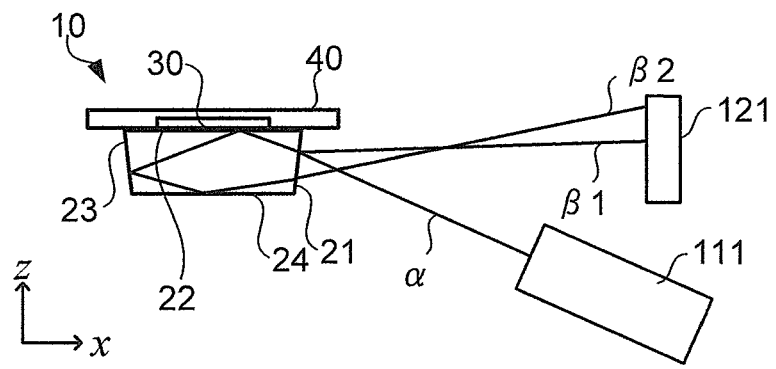
FIGS. 9A and 9B illustrate another light path of emission light and another aspect of the prism.
Figure 9B:
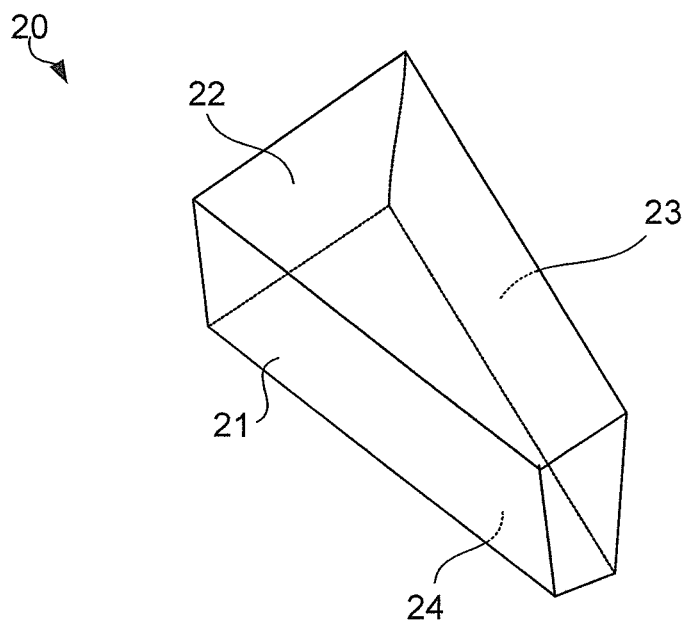

In addition, excitation light α may be emitted from incidence surface 21 as second reflection light β2 through a path different from the above-mentioned path. FIGS. 9A and 9B illustrate another light path of excitation light α in prism 20 and another aspect of the prism. FIG. 9A illustrates another light path of excitation light α in prism 20, and FIG. 9B illustrates another aspect of the prism. As illustrated in FIG. 9A, after hitting incidence surface 21, second reflection light β2 may be reflected by film formation surface 22 and emission surface 23 in this order, and then further reflected by bottom surface 24 of prism 20, and thereafter, emitted by incidence surface 21. In this case, preferably, the light reflected by emission surface 23 is totally reflected by bottom surface 24. For example, bottom surface 24 may be a mirror surface. In addition, as illustrated in FIG. 9B, emission surface 23 may be tilted. The tilt direction of emission surface 23 is not limited. In the present embodiment, emission surface 23 is rotated about a straight line extending along the Z-axis direction as a rotation axis. Also in this case, after hitting incidence surface 21, excitation light α may be reflected by film formation surface 22 and emission surface 23 in this order, and then reflected by bottom surface 24 of prism 20, and thereafter, emitted from incidence surface 21 as second reflection light β2. In this case, the position of second reflection light β2 is shifted in the Y-axis direction in comparison with the case where emission surface 23 is not tilted.

Figure 10:
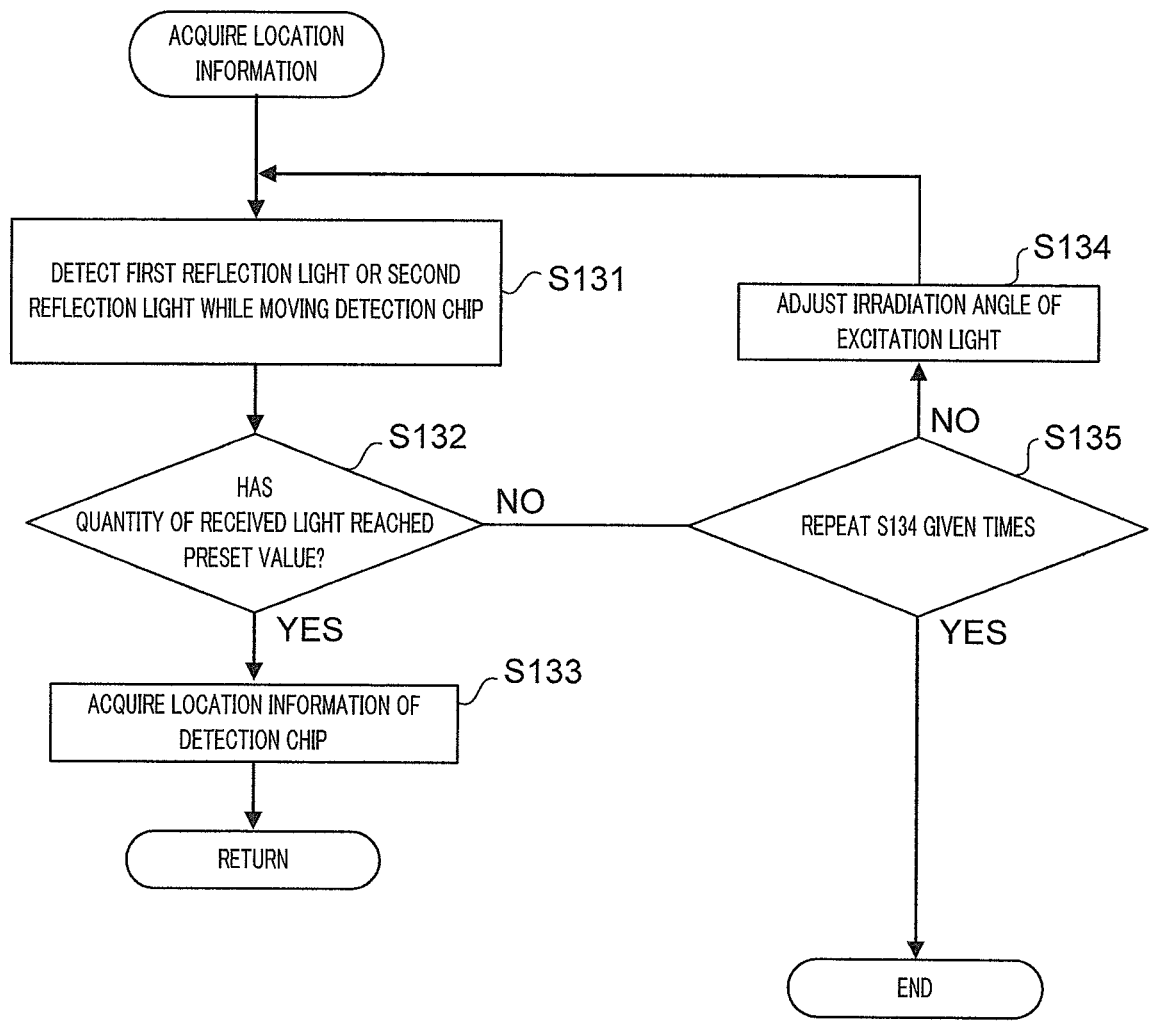
FIG. 10 is a flowchart of a step of acquiring location information of another detection chip.

In addition, in the detection operation of detection device 100 (the step of acquiring the location information of detection chip 10), an error of detection chip 10 and/or detection device 100 may be detected. FIG. 10 is a flowchart of another step of acquiring the location information of detection chip 10. This step of acquiring the location information of detection chip 10 by light receiving sensor 121 is different from the above-mentioned step of acquiring the location information of detection chip 10 (step S130) in that, when the detection value is a predetermined value or lower, the irradiation angle of excitation light α from excitation light emission unit 110 is adjusted and the detection at light receiving sensor 121 is again performed, or, in the next detection step for the detection object substance, detection at light receiving sensor 121 is stopped. In view of this, the configurations similar to those of step S130 are denoted with the same reference numerals and the description thereof is omitted.

As illustrated in FIG. 10, in the step of acquiring the location information of detection chip 10, in the case where the quantity of light received at light receiving sensor 121 at the time when detection chip 10 is brought close to light source unit 111 is a predetermined value or lower (step S132; NO), the irradiation angle of excitation light α is adjusted (step S134), and again, one of first reflection light β1 and second reflection light β2 is received at light receiving sensor 121 while bringing detection chip 10 close to light source unit 111. At this time, the step may be performed such that the step of adjusting the irradiation angle of excitation light α (step S134) is repeated multiple times (step S135; NO), and when the number of times of the repetition reaches a predetermined times (e.g. three times) (step S135; YES), the step is terminated without performing detection of the detection object substance. In this manner, in the step of acquiring the location information of detection chip 10, an error of detection chip 10 and/or detection device 100 can be detected. In addition, as illustrated in FIG. 2, since an error can be detected at an early point of time in measurement and a measurement error can be notified to the user as early as possible, the task of the user can be reduced.

Effect

As described above, in detection device 100 and the detection method according to the present embodiment, the incident angle to prism 20 with respect to the normal to film formation surface 22 is set such that one of first reflection light β1 and second reflection light β2 can be detected while irradiating incidence surface 21 with excitation light α, and thus reduction in accuracy of alignment of detection chip 10 due to excitation light α having entered prism 20 can be suppressed.

Note that, while light emitted in the step of acquiring location information and the step of detecting a detection object substance is excitation light α in the present embodiment, light emitted in the steps may be different from each other. Specifically, in the case where the light emitted in the step of detecting a detection object substance is excitation light α, the light emitted in the step of acquiring the location information of detection chip 10 may not be excitation light α. In addition, the quantity of the light emitted in the step of acquiring location information and the step of detecting a detection object substance may not be equal to each other.

While the detection method and detection device 100 use a SPFS in the present embodiment, the detection method and the detection device 100 according to the present invention are not limited to this. For example, the present invention can be applied to a detection method and a detection device which use the SPR method. In this case, fluorescence detection unit 130 detects light that is reflected by film formation surface 22 of prism 20 and emitted from emission surface 23, not fluorescence γ, as a sample light according to the amount of the detection object substance captured by detection chip 10. In addition, the present invention can be applied to a detection method and a detection device using an evanescent fluorescence method in which a fluorescence material for labelling a detection object substance is excited with evanescent light without using the SPR. In this case, detection chip 10 may not include metal film 30.

This application is entitled to and claims the benefit of Japanese Patent Application No. 2016-141529 filed on Jul. 19, 2016, the disclosure each of which including the specification, drawings and abstract is incorporated herein by reference in its entirety.

INDUSTRIAL APPLICABILITY

The detection method and the detection device according to the embodiment of the present invention can detect detection object substances with high reliability, and therefore are suitable for laboratory tests and the like, for example.

REFERENCE SIGNS LIST

10 Detection chip
20 Prism
21 Incidence surface
22 Film formation surface
23 Emission surface
24 Bottom surface
30 Metal film
40 Channel closure
41 Channel
100 Detection device
110 Excitation light emission unit
111 Light source unit
112 Angle adjustment section
113 Light source control section
120 Reflection light detection unit
121 Light receiving sensor
122 Sensor control section
130 Fluorescence detection unit
131 Light reception unit
132 Position switching section
133 Sensor control section
134 First lens
135 Optical filter
136 Second lens
137 Light receiving sensor
140 Liquid feeding unit
141 Chemical liquid chip
142 Syringe pump
143 Liquid feed pump driving section
144 Syringe
145 Plunger
150 Conveyance unit
152 Conveyance stage
154 Chip holder
160 Control section
α Excitation light
β1 First reflection light
β2 Second reflection light
γ Fluorescence

The invention claimed is:

1. A detection method that uses a detection device, the detection device including:
  a chip holder configured to hold a detection chip including a dielectric member having a first surface, a second surface and a third surface, wherein the dielectric member is transparent to light and a detection object substance is captured on a front surface side of the second surface;
  a moving stage configured to move the chip holder;
  a light emitter configured to emit light toward the first surface of the dielectric member of the detection chip held by the chip holder, and to change an irradiation angle of the light emitted toward the first surface;
  a reflection light detector configured to detect light that is emitted from the light emitter and is reflected by the dielectric member; and
  a sample light detector configured to detect sample light that is generated by irradiation with light from the light emitter, the sample light being generated in accordance with an amount of the detection object substance captured by the detection chip, the detection method comprising:
  setting the irradiation angle of light emitted from the light emitter toward the first surface such that only one of first reflection light and second reflection light is detected by the reflection light detector, the first reflection light being light from the light emitter that is reflected by the first surface, the second reflection light being light from the light emitter light that passes through the first surface and is reflected by the second surface and the third surface in this order;
  acquiring location information of the detection chip held by the chip holder based on a result of detection of the first reflection light or the second reflection light, the detecting being performed with the reflection light detector by emitting light from the light emitter at an irradiation angle set by the setting of the light irradiation angle while moving the detection chip held by the chip holder with the moving stage such that an irradiation spot of the light emitted from the light emitter passes through a boundary between the first surface and another surface adjacent to the first surface;
  moving the detection chip with the moving stage to a detection position on a basis of location information of the detection chip that is acquired, the detection position being configured for detecting the sample light; and
  detecting presence or an amount of the detection object substance captured by the detection chip at the detection position by, with the detection chip located at the detection position, emitting light from the light emitter and by detecting sample light by the sample light detector,
  wherein in the acquiring of the location information of the detection chip, the reflection light detector detects the second reflection light.

2. The detection method according to claim 1, wherein
  the reflection light detector includes a light receiving sensor including a light reception surface; and
  an irradiation angle of light with respect to a normal to the second surface prior to hitting on the dielectric member is set such that, in a plane including the light reception surface, a distance between the first reflection light and the second reflection light is greater than a length of the light reception surface in a range of a straight line connecting two points passing through optical axes of the first reflection light and the second reflection light.

3. The detection method according to claim 1, wherein the first surface is a planer surface, or each of the first surface, the second surface and the third surface is a planer surface.

4. The detection method according to claim 1, wherein the second reflection light is light that is reflected by the second surface and the third surface in this order after passing through the first surface, and is emitted from the dielectric member through the first surface without being reflected or passing through other surfaces.

5. The detection method according to claim 1, wherein in the setting of the light irradiation angle, the irradiation angle of the light from the light emitter is set based on a detection result of the reflection light detector.

6. The detection method according to claim 1, wherein in the setting of the light irradiation angle, the irradiation angle of the light emitted from the light emitter is set in accordance with a shape of the dielectric member.

7. The detection method according to claim 1, wherein
in the setting of the light irradiation angle, the irradiation angle of the light is set based on a dihedral angle between the second surface and the first surface such that only the first reflection light is detected by the reflection light detector; and
in the acquiring of location information of the detection chip, the reflection light detector detects the first reflection light.

8. The detection method according to claim 1, wherein in the setting of the light irradiation angle, the irradiation angle of the light from the light emitter is set based on a dihedral angle between the second surface and the first surface and a dihedral angle between the second surface and the third surface.

9. The detection method according to claim 1, wherein in the setting of the light irradiation angle, the irradiation angle of the light emitted from the light emitter is set in advance in the detection device.

10. The detection method according to claim 1, wherein in the setting of the light irradiation angle, the irradiation angle of the light emitted from the light emitter is set so as to satisfy expression (1) or expression (2)

$$\sin(\theta_a - \theta_i - 2°) > n_1 \cos \theta_b \qquad (1)$$

$$n_1 \cos \theta_b > \sin(\theta_a - \theta_i + 2°) \qquad (2)$$

where $\theta_i$ is the irradiation angle, with respect to the normal to the second surface, of the light emitted from the light emitter prior to hitting on the dielectric member, $\theta_a$ the dihedral angle between the second surface and the first surface, $\theta_b$ the dihedral angle between the second surface and the third surface, and $n_1$ a refractive index of the dielectric member.

11. The detection method according to claim 1, wherein in the acquiring of the location information of the detection chip, when the detection value in the reflection light detector is equal to or lower than a predetermined value, the irradiation angle of the light emitted from the light emitter is adjusted to again perform the detection in the reflection light detector, or the detection in the reflection light detector is stopped when detecting a next detection object substance.

12. The detection method according to claim 1, wherein a metal film is disposed in at least a part of the second surface; and in the detecting of the detection object substance, the light emitter emits light toward the metal film of the detection chip held by the chip holder at an angle different from the irradiation angle of the light emitted toward the first surface in the setting of the light irradiation angle, and the sample light detector detects the presence or the amount of the detection object substance by detecting sample light resulting from surface plasmon resonance generated by the light from the light emitter that enters the dielectric member and hits a rear surface of the metal film.

13. The detection method according to claim 12, wherein
a capturing body for capturing the detection object substance is disposed in a front surface of the metal film, the front surface being opposite to the dielectric member;
in the detecting of the detection object substance, excitation light is emitted from the light emitter; and
the sample light detector detects fluorescence that is emitted from a fluorescence material labelling the detection object substance by irradiation of the metal film with the excitation light.

14. A The detection method that uses a detection device, the detection device including:
a chip holder configured to hold a detection chip including a dielectric member having a first surface, a second surface and a third surface, wherein the dielectric member is transparent to light and a detection object substance is captured on a front surface side of the second surface;
a moving stage configured to move the chip holder;
a light emitter configured to emit light toward the first surface of the dielectric member of the detection chip held by the chip holder, and to change an irradiation angle of the light emitted toward the first surface;
a reflection light detector configured to detect light that is emitted from the light emitter and is reflected by the dielectric member; and
a sample light detector configured to detect sample light that is generated by irradiation with light from the light emitter, the sample light being generated in accordance with an amount of the detection object substance captured by the detection chip, the detection method comprising:
setting the irradiation angle of light emitted from the light emitter toward the first surface such that only one of first reflection light and second reflection light is detected by the reflection light detector, the first reflection light being light from the light emitter that is reflected by the first surface, the second reflection light being light from the light emitter light that passes through the first surface and is reflected by the second surface and the third surface in this order;
acquiring location information of the detection chip held by the chip holder based on a result of detection of the first reflection light or the second reflection light, the detecting being performed with the reflection light detector by emitting light from the light emitter at an irradiation angle set by the setting of the light irradiation angle while moving the detection chip held by the chip holder with the moving stage such that an irradiation spot of the light emitted from the light emitter passes through a boundary between the first surface and another surface adjacent to the first surface;
moving the detection chip with the moving stage to a detection position on a basis of location information of the detection chip that is acquired, the detection position being configured for detecting the sample light; and detecting presence or an amount of the detection object substance captured by the detection chip at the detection position by, with the detection chip located at the detection position, emitting light from the light emitter and by detecting sample light by the sample light detector, wherein in the setting of the light irradiation angle, the irradiation angle of the light emitted from the light emitter is set based on the detection value in the reflection light detector, the detection value in the reflection light detector being changed by changing an irradiation angle of light from the light emitter in a state where the detection chip is fixed.

15. A detection device comprising:

a chip holder configured to hold a detection chip including a dielectric member having a first surface, a second surface and a third surface, wherein the dielectric member is transparent to light and a detection object substance is captured on a front surface side of the second surface;

a moving stage configured to move the chip holder;

a light emitter configured to emit light toward the first surface of the dielectric member of the detection chip held by the chip holder, and to change an irradiation angle of the light emitted toward the first surface;

a reflection light detector configured to detect light that is emitted from the light emitter and is reflected by the dielectric member;

a sample light detector configured to detect sample light that is generated by irradiation with light from the light emitter, the sample light being generated in accordance with an amount of the detection object substance captured by the detection chip; and a controller configured to control the moving stage, the light emitter, the reflection light detector and the sample light detector, wherein the controller causes the light emitter to set a light irradiation angle such that only one of first reflection light and second reflection light is detected by the reflection light detector, the first reflection light being light that is emitted from the light emitter and is reflected by the first surface, the second reflection light being light that is emitted from the light emitter and is reflected by the second surface and the third surface in this order after passing through the first surface; and causes the light emitter to emit light at an irradiation angle set by the light emitter while moving the detection chip held by the chip holder with the moving stage such that an irradiation spot of light emitted from the light emitter passes through a boundary between the first surface and another surface adjacent to the first surface so as to acquire location information of the detection chip, wherein in the acquiring of the location information of the detection chip, the reflection light detector detects the second reflection light.

16. A detection device comprising:

a chip holder configured to hold a detection chip including a dielectric member having a first surface, a second surface and a third surface, wherein the dielectric member is transparent to light and a detection object substance is captured on a front surface side of the second surface;

a moving stage configured to move the chip holder;

a light emitter configured to emit light toward the first surface of the dielectric member of the detection chip held by the chip holder, and to change an irradiation angle of the light emitted toward the first surface;

a reflection light detector configured to detect light that is emitted from the light emitter and is reflected by the dielectric member;

a sample light detector configured to detect sample light that is generated by irradiation with light from the light emitter, the sample light being generated in accordance with an amount of the detection object substance captured by the detection chip; and a controller configured to control the moving stage, the light emitter, the reflection light detector and the sample light detector, wherein the controller causes the light emitter to set a light irradiation angle such that only one of first reflection light and second reflection light is detected by the reflection light detector, the first reflection light being light that is emitted from the light emitter and is reflected by the first surface, the second reflection light being light that is emitted from the light emitter and is reflected by the second surface and the third surface in this order after passing through the first surface; and causes the light emitter to emit light at an irradiation angle set by the light emitter while moving the detection chip held by the chip holder with the moving stage such that an irradiation spot of light emitted from the light emitter passes through a boundary between the first surface and another surface adjacent to the first surface so as to acquire location information of the detection chip, wherein in the setting of the light irradiation angle, the irradiation angle of the light emitted from the light emitter is set based on the detection value in the reflection light detector, the detection value in the reflection light detector being changed by changing an irradiation angle of light from the light emitter in a state where the detection chip is fixed.

* * * * *